(12) United States Patent
Shiono et al.

(10) Patent No.: US 10,495,796 B2
(45) Date of Patent: *Dec. 3, 2019

(54) NEAR-INFRARED CUT FILTER

(71) Applicant: AGC INC., Tokyo (JP)

(72) Inventors: Kazuhiko Shiono, Koriyama (JP);
Hiroyuki Arishima, Koriyama (JP);
Teppei Konishi, Koriyama (JP); Hiroki Hotaka, Koriyama (JP)

(73) Assignee: AGC INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/106,485

(22) Filed: Aug. 21, 2018

(65) Prior Publication Data

US 2018/0356576 A1 Dec. 13, 2018

Related U.S. Application Data

(63) Continuation of application No. 14/729,275, filed on Jun. 3, 2015, now Pat. No. 10,082,611, which is a continuation of application No. PCT/JP2013/082683, filed on Dec. 5, 2013.

(30) Foreign Application Priority Data

Dec. 6, 2012 (JP) .................................. 2012-267054
Jun. 7, 2013 (JP) .................................. 2013-120894

(51) Int. Cl.
| | | |
|---|---|---|
| *G02B 5/28* | (2006.01) | |
| *G02B 5/20* | (2006.01) | |
| *G02B 5/22* | (2006.01) | |
| *C08K 5/3417* | (2006.01) | |
| *C09B 57/00* | (2006.01) | |
| *C09B 67/22* | (2006.01) | |
| *G02B 1/04* | (2006.01) | |

(52) U.S. Cl.
CPC ............. *G02B 5/282* (2013.01); *C08K 5/3417* (2013.01); *C09B 57/007* (2013.01); *C09B 67/0034* (2013.01); *G02B 1/04* (2013.01); *G02B 5/208* (2013.01); *G02B 5/223* (2013.01)

(58) Field of Classification Search
USPC ...................................................... 252/587
See application file for complete search history.

(56) References Cited

U.S. PATENT DOCUMENTS

| | | | |
|---|---|---|---|
| 5,543,086 A | 8/1996 | Bertelson et al. | |
| 9,268,072 B2* | 2/2016 | Hasegawa | ............ G02B 13/004 |
| 2002/0014819 A1 | 2/2002 | Ozawa et al. | |
| 2011/0245538 A1 | 10/2011 | Kato et al. | |
| 2014/0264202 A1* | 9/2014 | Nagaya | .................. G02B 5/208 |
| | | | 252/587 |
| 2015/0146057 A1 | 5/2015 | Konishi et al. | |

FOREIGN PATENT DOCUMENTS

| | | |
|---|---|---|
| CN | 102262254 | 11/2011 |
| CN | 103858028 | 6/2014 |
| JP | 2000-037955 | 2/2000 |
| JP | 2001-192350 | 7/2001 |
| JP | 2004-238606 | 8/2004 |
| JP | 2006-030944 | 2/2006 |
| JP | 2008-051985 | 3/2008 |
| JP | 2008-112032 | 5/2008 |
| JP | 2008-112033 | 5/2008 |
| JP | 2009-127016 | 6/2009 |
| JP | 2011-100084 | 5/2011 |
| JP | 2011-208101 | 10/2011 |
| JP | 2012-007038 | 1/2012 |
| JP | 2012-8532 | 1/2012 |
| JP | 2012-103340 | 5/2012 |
| KR | 10-2011-0129832 | 12/2011 |
| KR | 10-2014-0088559 | 7/2014 |
| TW | 201211125 | 3/2012 |
| TW | 201321438 | 6/2013 |
| WO | WO 2013/054864 | 4/2013 |

OTHER PUBLICATIONS

International Search Report dated Feb. 25, 2014 in PCT/JP2013/082683 filed Dec. 5, 2013.
International Preliminary Report of Patentability and Written Opinion dated Jun. 18, 2015 in PCT/JP2013/082683 (English translation only).

* cited by examiner

*Primary Examiner* — Monique R Peets
(74) *Attorney, Agent, or Firm* — Oblon, McClelland, Maier & Neustadt, L.L.P.

(57) ABSTRACT

There is provided a near-infrared cut filter which has a visible light transmitting property and a near-infrared shielding property both at high levels by that its transmission spectrum has a steep inclination in the vicinity of the boundary between the visible light and the near-infrared, and which can also be sufficiently reduced in size and thickness. The near-infrared cut filter has a near-infrared absorbing layer which contains a near-infrared absorbing dye containing at least one dye in which a condensed ring structure containing at least a benzene ring and a ring having nitrogen atom is bonded to both sides of a squarylium skeleton and which have a carboxylic acid amide structure at a second position of the benzene ring (where the carboxylic acid has a substituent having 5 to 25 having one or more branches), and a transparent resin with a refractive index of 1.45 or more.

14 Claims, 6 Drawing Sheets

NEAR-INFRARED CUT FILTER

CROSS-REFERENCE TO RELATED APPLICATIONS

This application is a continuation of U.S. application Ser. No. 14/729,275, filed Jun. 3, 2015; which is a continuation of prior International Application No. PCT/JP2013/082683 filed on Dec. 5, 2013, which is based upon and claims the benefit of priority from Japanese Patent Applications No. 2012-267054 filed on Dec. 6, 2012, and No. 2013-120894 filed on Jun. 7, 2013; the entire contents of all of which are incorporated herein by reference.

TECHNICAL FIELD

The present invention relates to a near-infrared cut filter having a near-infrared shielding effect.

BACKGROUND ART

In recent years, optical filters which sufficiently transmit light in a visible wavelength region but shield light in a near-infrared wavelength region have been used for various applications.

For example, a solid-state image sensing device (such as CCD or CMOS) is used in an imaging device such as a digital still camera and a digital video camera. In order to make sensitivity of the solid-state image sensing device close to visibility of a human being, an optical filter is disposed between an imaging lens and the solid-state image sensing device.

Among them, as an optical filter for an imaging device, a glass filter has been known in which a CuO or the like is added to a fluorophosphate-based glass or a phosphate-based glass so as to enable selective absorption of light in the near-infrared wavelength region. However, in addition to being expensive, a glass filter of light-absorbing type may not sufficiently exhibit a function based on components of the glass when being made thin, and there has been a problem that it cannot sufficiently respond to requirements of size reduction and thickness reduction of an imaging device of late years.

Accordingly, in order to solve the above-described problems, there has been developed an optical filter in which, for example, a silicon oxide (SiO$_2$) layer and a titanium oxide (TiO$_2$) layer are stacked alternately on a substrate as a reflection layer, and the reflection layer reflecting light in the near-infrared wavelength region by interference of light and a resin layer containing a dye absorbing near infrared rays are stacked (see, for example, Patent Reference 1 (JP-A 2008-051985)).

However, in these conventional optical filters for imaging devices, performance for shielding light of wavelengths in the near-infrared region and a transmitting property of wavelength band (630 nm to 700 nm) required for imaging a dark part more brightly are insufficient. Moreover, since there is also a constraint on layer formation such that the function of the solid-state image sensing device should not be hindered, currently an optical filter having a sufficient near-infrared cut filter function has not been obtained.

In this respect, in Patent Reference 2 (JP-A 2012-008532), use of a squarylium-based dye as a near-infrared absorbing dye is described. The dye described in Patent Reference 2, although having high transmittance of 630 nm to 700 nm as compared to conventional near-infrared absorbing dye, this transmittance is not sufficiently high, and solubility to the resin is also low. Thus, there has been a problem that the near-infrared absorbing layer cannot be made sufficiently thin.

SUMMARY OF THE INVENTION

It is an object of the present invention to provide a near-infrared cut filter which has an excellent near-infrared shielding property, that is, having a visible light transmitting property and a near-infrared shielding property both at high levels by that its transmission spectrum has a steep inclination in the vicinity of the boundary between the visible light region and the near-infrared region, and which can also be sufficiently reduced in size and thickness.

The present invention provides a near-infrared cut filter having following structures.

[1] A near-infrared cut filter including a near-infrared absorbing layer containing a near-infrared absorbing dye (A) which contains one or more dyes selected from near-infrared absorbing dyes (A1) expressed by the following formula (A1), and a transparent resin (B) with a refractive index of 1.45 or more,

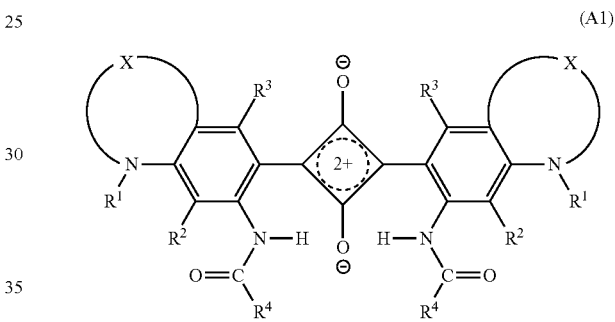

(A1)

where symbols in the formula (A1) are as follows,

X is independently a bivalent organic group expressed by the following formula (1) or formula (2) in which one or more hydrogen atoms may be substituted with an alkyl group or alkoxy group having 1 to 12 carbon atoms, $$-(CH_2)_{n1}- \quad (1)$$

where n1 is 2 or 3 in the formula (1), $$-(CH_2)_{n2}-O-(CH_2)_{n3}- \quad (2)$$

where n2 and n3 are each independently an integer of 0 to 2, and n2+n3 is 1 or 2 in the formula (2), R$^1$ independently represents a saturated or unsaturated hydrocarbon group having 1 to 12 carbon atoms which may include a saturated ring structure and may have a branch, a saturated cyclic hydrocarbon group having 3 to 12 carbon atoms, an aryl group having 6 to 12 carbon atoms or alaryl group having 7 to 13 carbon atoms, R$^2$ and R$^3$ independently represent a hydrogen atom, a halogen atom, or an alkyl group or alkoxy group having 1 to 10 carbon atoms, and R$^4$ is independently a hydrocarbon group having 5 to 25 carbon atoms with at least one or more branches, in which one or more hydrogen atoms may be substituted by a halogen atom, a hydroxyl group, a carboxy group, a sulfo group, or a cyano group, and in which the hydrocarbon group may contain an unsaturated bond, an oxygen atom, or a saturated or unsaturated ring structure between carbon atoms.

[2] The near-infrared cut filter according to [1], wherein X in the formula (A1) is a bivalent organic group expressed by the following formula (3), $$CR^{11}_2-(CR^{12}_2)_{n4}- \quad (3),$$

where the formula (3) represents a bivalent group in which the left side is bonded to the benzene ring and the right side is bonded to N, and in the formula (3) n4 is 1 or 2, $R^{11}$ is each independently an alkyl group or alkoxy group having 1 to 12 carbon atoms which may have a branch, and $R^{12}$ is each independently a hydrogen atom or an alkyl group or alkoxy group having 1 to 12 carbon atoms which may have a branch. [3] The near-infrared cut filter according to [2], wherein in the formula (3) $R^{11}$ is each independently an alkyl group or alkoxy group having 1 to 6 carbon atoms which may have a branch, and $R^{12}$ is each independently a hydrogen atom or an alkyl group or alkoxy group having 1 to 6 carbon atoms which may have a branch.

[4] The near-infrared cut filter according to [1], wherein X in the foi mula (A 1) is one of bivalent organic groups expressed by the following formula (11-1) to a following formula (12-3), $$-C(CH_3)_2-CH(CH_3)- \quad (11-1),$$

$$-C(CH_3)_2-CH_2- \quad (11-2),$$

$$-C(CH_3)_2-CH(C_2H_5)- \quad (11-3),$$

$$-C(CH_3)_2-CH_2-CH_2- \quad (12-1),$$

$$-C(CH_3)_2-CH_2-CH(CH_3)- \quad (12-2),$$

$$-C(CH_3)_2-CH(CH_3)-CH_2- \quad (12-3),$$

where in all the groups represented by the formulas (11-1) to (12-3), a left side is bonded to a benzene ring and a right side is bonded to N.

[5] The near-infrared cut filter according to [1], wherein in the formula (A1) $R^4$ is independently a branched hydrocarbon group having 5 to 25 carbon atoms with no substituent expressed by the following formula (4), $$-CH_{3-m}R^{13}_m \quad (4)$$

where in the formula (4), m represents 1, 2 or 3, and $R^{13}$ each independently represents a linear or branched hydrocarbon group (wherein $R^{13}$ is branched when m is 1) which may contain an unsaturated bond, an oxygen atom, or a saturated or unsaturated ring structure between carbon atoms, and a number of carbon atoms of $R^{13}$ of the m unit is 4 to 24 in total.

[6] The near-infrared cut filter according to [1], wherein the number of carbon atoms of $R^4$ in the formula (A1) is independently 6 to 20.

[7] The near-infrared cut filter according to [1], wherein when the near-infrared absorbing dye (A) is contained by a content satisfying following conditions (ii-1) and (ii-2), the near-infrared absorbing layer satisfies a following condition (ii-3), (ii-1) a shortest wavelength $\lambda_a$ with transmittance of 1% in a wavelength region of 650 nm to 800 nm is 675 nm$\leq \lambda_a \leq$720 nm, (ii-2) a relation between a longest wavelength $\lambda_b$ with transmittance of 1% in the wavelength region of 650 nm to 800 nm and the $\lambda_a$ is $\lambda_b-\lambda_a$=30 nm, (ii-3) a relation of a wavelength $\lambda_c$ with 70% on a shorter wavelength side than the $\lambda_a$ in the wavelength region of 650 nm to 800 nm, the $\lambda_a$, and the refractive index $n_d(B)$ of the transparent resin (B) is $n_d(B)\times(\lambda_a-\lambda_c)\leq 115$.

[8] The near-infrared cut filter according to [1], wherein the transparent resin (B) contains at least one selected from the group consisting of acrylic resin, epoxy resin, ene-thiol resin, polycarbonate resin, polyether resin, polyarylate resin, polysulfone resin, polyethersulfone resin, polyparaphenylene resin, polyarylene ether phosphine oxide resin, polyimide resin, polyamide-imide resin, polyolefin resin, cyclic olefin resin, and polyester resin.

[9] The near-infrared cut filter according to [1], wherein a ratio of the near-infrared absorbing dye (A) is 0.1 to 20 parts by mass to 100 parts by mass of the transparent resin (B).

[10] The near-infrared cut filter according to [1], further including a selected wavelength shielding layer having following characteristics (iii-1) and (iii-2) on one side or both sides of the near-infrared absorbing layer, (iii-1) transmittance is 90% or more in a wavelength region of 420 nm to 695 nm, (iii-2) transmittance is 2% or less in a wavelength region from a longest wavelength $\lambda_b$ with transmittance of 1% in a wavelength region of 650 nm to 800 nm of the near-infrared absorbing layer to 1100 nm.

[11] The near-infrared cut filter according to [10], wherein the selected wavelength shielding layer is constituted of a dielectric multilayer film in which a dielectric film with a refractive index of 1.45 or more and less than 1.55 and a dielectric film with a refractive index of 2.2 to 2.5 are alternately stacked.

[12] The near-infrared cut filter according to [10], wherein the near-infrared cut filter satisfies following conditions (iv-1), (iv-2) and (iv-3), (iv-1) average transmittance is 80% or more in a wavelength region of 420 nm to 620 nm, (iv-2) transmittance is 2% or less in a wavelength region of 710 nm to 1100 nm, (iv-3) a difference is 3 nm or less between a wavelength with 20% transmittance of light incident from a direction orthogonal to a main surface and a wavelength with 20% transmittance of light incident from a direction making an angle of 30 degrees relative to a line orthogonal to the main surface, in a wavelength region of 600 nm to 700 nm.

In a near-infrared cut filter of the present invention, a near-infrared absorbing dye used has a steep inclination in the vicinity of the boundary between a visible light region and a near-infrared region in its light absorption curve, and solubility to resin is high. Thus, the near-infrared absorbing layer formed together with a transparent resin has an excellent near-infrared absorbing property even when it is a thin film, enabling size reduction or thickness reduction of elements.

DETAILED DESCRIPTION

Figure 1A:
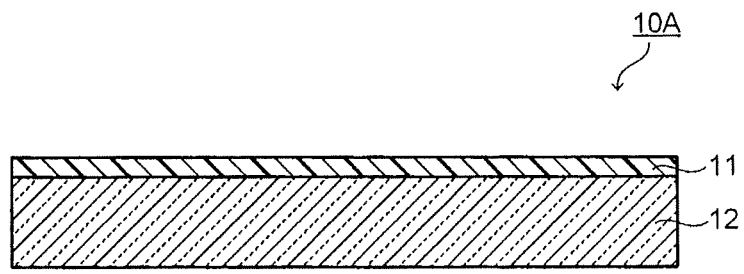
FIG. 1A is a cross-sectional view schematically illustrating an example of a near-infrared cut filter according to an embodiment of the present invention.

An embodiment of the present invention will be described below, Note that the present invention should not be construed as being limited to the following description. A near-infrared cut filter of the present invention (hereinafter referred to as a present filter) has a near-infrared absorbing layer containing a near-infrared absorbing dye (A) and a transparent resin (B). The near-infrared absorbing layer in the present invention is a resin layer mainly constituted of the transparent resin (B), and the near-infrared absorbing dye (A) exists in a state of being dispersed in the resin layer. The dye (A) contains one or more dyes selected from dyes represented by a formula (A1) (hereinafter referred to as dye (A1)), and a refractive index of the transparent resin (B) is 1.45 or more. Here, in this description, unless otherwise stated, the refractive index refers to a refractive index with a 589 nm wavelength at 20° C. (hereinafter also referred to as nd).

In the present filter, the near-infrared absorbing layer has a good near-infrared shielding function when it is used solely or combined with another selected wavelength shielding member, and can achieve sufficient size reduction, thickness reduction, and cost reduction of the imaging device.

Note that the point that the near-infrared absorbing layer has a good near-infrared shielding function means that an inclination in the vicinity of the boundary between the visible light region and the near-infrared region (630 nm to 700 nm wavelengths) in a light absorption curve is steep and a near-infrared absorption wavelength region is wide, and a wavelength region which is not sufficiently absorbed barely appears in the near-infrared region when it is used in combination with another selected wavelength shielding member, In the near-infrared cut filter (hereinafter referred to as an NIR filter), generally, a selected wavelength shielding member is used which has capabilities to precisely shield light in the infrared region of 700 nm or more and to widely select a wavelength region to be shielded. As the selected wavelength shielding member, a dielectric multilayer film in which dielectric films having different refractive indices are stacked alternately is widely used. The dielectric multilayer film shifts in absorption wavelength depending on an incident angle of light, and has angle dependency.

In the present filter, due to absorption by the dye (A), the influence of the angle dependency can be made small even when it has the dielectric multilayer film, and light in a necessary wavelength region can be absorbed sufficiently.

Further, in the transmission spectrum, transmittance of the visible light region is maintained high, and meanwhile, transmittance of inclined wavelength region of the spectrum can be maintained high because the inclination in the vicinity of the boundary between the visible light region and the near-infrared region is steep. Moreover, an NIR filter with high heat reliability can be obtained by using the dye (A) having high heat resistance.

(Near-Infrared Absorbing Dye (A1))

A dye (A1) expressed by the following formula (A1) used in the present filter will be described. In this description, a group represented by a formula (1) will be abbreviated as group (1), and the same applies to other groups.

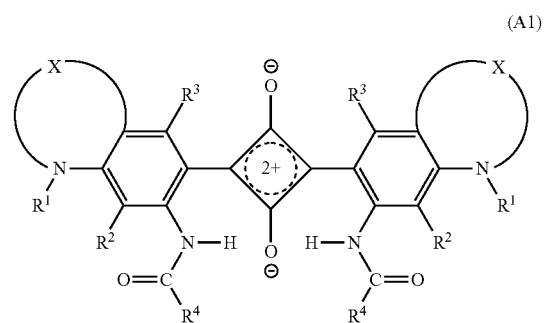

(A1)

Here, symbols in the formula (A1) are as follows.

X is independently a bivalent organic group expressed by the following formula (1) or formula (2) in which one or more hydrogen atoms may be substituted with an alkyl group or alkoxy group having 1 to 12 carbon atoms,

—(CH$_2$)$_{n1}$—   (1)

where n1 is 2 or 3 in the formula (1),

—(CH$_2$)$_{n2}$—O—(CH$_2$)$_{n3}$—   (2)

where n2 and n3 are each independently an integer of 0 to 2, and n2+n3 is 1 or 2 in the formula (2), $R^1$ independently represents a saturated or unsaturated hydrocarbon group having 1 to 12 carbon atoms which may include a saturated ring structure and may have a branch, a saturated cyclic hydrocarbon group having 3 to 12 carbon atoms, an aryl group having 6 to 12 carbon atoms or alaryl group having 7 to 13 carbon atoms, $R^2$ and $R^3$ independently represent a hydrogen atom, a halogen atom, or an alkyl group or alkoxy group having 1 to 10 carbon atoms, and $R^4$ is independently a hydrocarbon group having 5 to 25 carbon atoms with at least one or more branches, in which one or more hydrogen atoms may be substituted by a halogen atom, a hydroxyl group, a carboxy group, a sulfo group, or a cyano group, and in which the hydrocarbon group may contain an unsaturated bond, an oxygen atom, or a saturated or unsaturated ring structure between carbon atoms.

Note that in this description, the saturated or unsaturated ring structure refers to a hydrocarbon ring and a heterocycle having an oxygen atom as an atom constituting a ring structure. Moreover, a structure in which an alkyl group having 1 to 10 carbon atoms is bonded to a carbon atom constituting a ring is included in this category. Further, in this description, the aryl group refers to a group which is bonded via a carbon atom constituting an aromatic ring, for example, a benzene ring, a naphthalene ring, a biphenyl ring, a furan ring, a thiophene ring, a pyrrole ring, or the like, which an aromatic compound has. The alaryl group refers to a linear or branched, saturated or unsaturated hydrocarbon group which may contain a saturated ring structure, or a saturated cyclic hydrocarbon group, which is substituted with one or more aryl groups.

The dye (A1) has a squarylium skeleton in a center of a molecular structure and has one condensed ring structure on each of the left and right sides such that one benzene ring is bonded to each of the left and right sides of the squarylium skeleton, each benzene ring thereof is bonded to a nitrogen atom at a fourth position, and a heterocycle is formed including the nitrogen atom and the fourth-position and fifth-position carbon atoms of the benzene ring. Moreover, the dye (A1) is bonded to —NHC(=O)R$^4$ in the second position of the one benzene ring on each of the left and right sides.

In the dye (A1), the structure of the ring other than the benzene ring constituting the condensed ring structure existing one each on the left and right sides is determined by the above X, and is each independently a 5 or 6-membered heterocyclic ring. The bivalent group X constituting part of the heterocyclic ring may have a skeleton constituted only of carbon atoms as represented in the above formula (1), or may contain oxygen atoms other than the carbon atoms as represented in the above formula (2). In the formula (2), the position of the oxygen atom is not particularly limited. That is, a nitrogen atom and an oxygen atom may be bonded, or an oxygen atom may be bonded directly to the benzene ring. Further, an oxygen atom may be positioned so as to be sandwiched by carbon atoms in the formula (2).

Note that the X on the left and right sides in the dye (A1) may be the same or different, but from the viewpoint of productivity they are preferred to be the same. Further, R$^1$ to R$^4$ may be the same or different on the left and right sides across the squarylium skeleton, but from the viewpoint of productivity they are preferred to be the same.

The dye (A1) has the above structure and is highly soluble to an organic solvent or the transparent resin (B) having a refractive index of 1.45 or more. Thus, the near-infrared absorbing layer has an excellent near-infrared absorbing property even when it is a thin film, enabling size reduction or thickness reduction of elements. Further, dye (A1) has a near-infrared absorbing property with a steep inclination of a light absorption curve in the vicinity of the boundary between the visible light region and the near-infrared region when solved in the transparent resin (B). Thus, the near-infrared absorbing layer containing the dye (A1) and the transparent resin (B) exhibits high visible light transmittance and can widely secure the absorption width of the near-infrared absorption wavelength region.

Generally, the higher the solubility of a compound to an organic solvent, the higher its compatibility to resin. That is, the higher the solubility of the dye (A1) to an organic solvent, the higher its compatibility to the transparent resin (B). As a result, if the near-infrared absorbing layer is made thin, the angle dependency which the dielectric multilayer film has can be sufficiently excluded when the dielectric multilayer film is combined. Moreover, when the range of selection of solvents is extended, it has an advantage in manufacturing that adjustment of coating conditions becomes easy.

The dye (A1) also excels in heat resistance. When the present filter is manufactured by combining the near-infrared absorbing layer and another selected wavelength shielding member, a heat treatment can be performed in some cases in film formation of the transparent resin (B) or formation of the selected wavelength shielding layer. Since the dye (A1) has heat resistance, performance of the dye (A1) barely decreases by the heat treatment, which is advantageous in manufacturing. This increases the freedom of kind of the selected wavelength shielding layer to be used in combination with the near-infrared absorbing layer, enabling to produce a high-performance optical filter.

X in the dye (A1) is preferably a bivalent organic group expressed by the following formula (3).

—CR$^{11}_2$—(CR$^{12}_2)_{n4}$—　　　(3)

Wherein, the formula (3) represents a bivalent group in which the left side is bonded to the benzene ring and the right side is bonded to N. In the formula (3), n4 is 1 or 2, and n4 is preferred to be 1. Further, R$^{11}$ is each independently an alkyl group or alkoxy group having 1 to 12 carbon atoms which may have a branch, and preferably is an alkyl group or alkoxy group having 1 to 6 carbon atoms which may have a branch. Moreover, R$^{12}$ is each independently a hydrogen atom or an alkyl group or alkoxy group having 1 to 12 carbon atoms which may have a branch, and preferably is a hydrogen atom or an alkyl group or alkoxy group having 1 to 6 carbon atoms which may have a branch.

X in the formula (A1) is particularly preferably one of bivalent organic groups represented by following formulas (11-1) to (12-3). Wherein, the formulas (11-1) to (12-3) represent bivalent groups in which the left side is bonded to the benzene ring and the right side is bonded to N.

—C(CH$_3$)$_2$—CH(CH$_3$)—　　　(11-1)

—C(CH$_3$)$_2$—CH$_2$—　　　(11-2)

—C(CH$_3$)$_2$—CH(C$_2$H$_5$)—　　　(11-3)

—C(CH$_3$)$_2$—CH$_2$—CH$_2$—　　　(12-1)

—C(CH$_3$)$_2$—CH$_2$—CH(CH$_3$)—　　　(12-2)

—C(CH$_3$)$_2$—CH(CH$_3$)—CH$_2$—　　　(12-3)

Among them, X in the formula (A1) is preferably one of the groups (11-1) to (11-3), and is more preferably a group (11-1).

Structural formulas of a dye (A11) in which X is the group (11-1) on both the left and right sides and a dye (A12) in which X is the group (12-1) on both the left and right sides are presented below. Note that in the dyes (A11), (A12), R$^1$ to R$^4$ are of the same meaning as in the dye (A1).

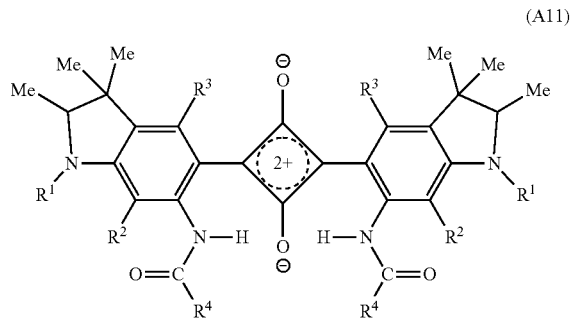

(A11)

-continued

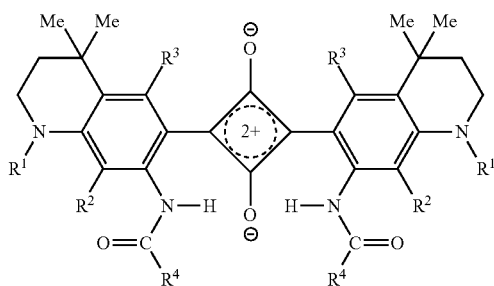

(A12)

In the dye (A1), from the viewpoint of heat resistance and reliability improvement, $R^1$ is preferably an alkyl group or alkoxy group having 1 to 12 carbon atoms which may have a branch independently, more preferably an alkyl group or alkoxy group having 1 to 6 carbon atoms which may have a branch. In order to increase solubility to the transparent resin, an alkyl group having 1 to 6 carbon atoms which has a branch is further preferred.

Moreover, in the dye (A1), $R^2$ and $R^3$ are independently preferred to be a hydrogen atom, a halogen atom or an alkyl group or alkoxy group having 1 to 6 carbon atoms. $R^2$ and $R^3$ are both preferred to be a hydrogen atom.

$R^4$ in the dye (A1) is preferably a branched hydrocarbon group having 5 to 25 carbon atoms expressed by the following formula (4).

(4)

Where, in the formula (4), m represents 1, 2 or 3, and $R^{13}$ each independently represents a linear chain or branched hydrocarbon group (wherein, $R^{13}$ is branched when m is 1) which may contain an unsaturated bond, an oxygen atom, or a saturated or unsaturated ring structure between carbon atoms, and a number of carbon atoms of $R^{13}$ of the m unit is 4 to 24 in total. From the viewpoint of solubility to transparent resin, m is preferably 2 or 3.

Examples of the saturated ring structure which $R^{13}$ may have include cyclic ether, cycloalkane, adamantane ring, diadamantane ring, or the like, having 4 to 14 carbon atoms. Further, examples of the unsaturated ring structure include benzene, toluene, xylene, furan, benzofuran, or the like. When having a ring structure, the number of carbon atoms of $R^{13}$ is indicated by a number of carbon atoms including a number of carbon atoms of the ring.

Further, $R^4$ is preferably a branched hydrocarbon group having 6 to 20 carbon atoms and having no substituent independently from the viewpoint of solubility to the organic solvent and the transparent resin (B). The number of carbon atoms of $R^4$ is more preferably 6 to 17, furthermore preferably 6 to 14.

When $R^4$ is the group (4) of m=1, $R^{13}$ is a branched hydrocarbon group having 4 to 24 carbon atoms which may include an unsaturated bond, an oxygen atom, or saturated or unsaturated ring structure between carbon atoms. $R^{13}$ is preferably a saturated hydrocarbon group which may contain an oxygen atom or a saturated or unsaturated ring structure. The number of carbon atoms of $R^{13}$ is preferably 5 to 19, more preferably 5 to 16, furthermore preferably 5 to 13 from the viewpoint of improving solubility to the organic solvent and the transparent resin (B).

A specific example of the branched $R^{13}$ (hereinafter the branched $R^{13}$ will be described as $R^{13b}$ as necessary) when m is 1, is $R^{13b}$ having 4 to 23 carbon atoms in a main chain and having one to five methyl groups or ethyl groups, preferably a methyl group as a side chain. The number of side chains is preferably one per one carbon atom excluding terminals. A terminal of $R^{13b}$ is preferably —C(CH$_3$)$_3$. The $R^{13b}$ is preferably 1-methyl propyl group, 2-methyl propyl group, 1,1-dimethyl ethyl group, 1-methyl butyl group, 2-methyl butyl group, 1,3,3-trimethyl butyl group, 1,2,2-trimethyl butyl group, 3,5,5-trimethyl hexyl group, or the like. Among them, 1,3,3-trimethyl butyl group and 2-methyl propyl group are more preferred, and 2-methyl propyl group is particularly preferred.

Specific examples of the group in which $R^{13b}$ contains an oxygen atom or a saturated or unsaturated ring structure include a group containing an oxygen atom or a ring structure between carbon atoms of the main chain of the above-exemplified $R^{13b}$, a group containing both an oxygen atom and a ring structure between the carbon atoms of the main chain of the above-exemplified $R^{13b}$, or the like. When $R^{13b}$ has both an oxygen atom and a ring structure, each of them may exist between other carbon atoms, and for example, may exist continuously such as —O-Ph- (where Ph represents a benzene ring).

When $R^4$ is the group (4) of m=2, two $R^{13}$ are each independently a linear or branched hydrocarbon group having 1 to 23 carbon atoms which may contain an unsaturated bond, an oxygen atom, or a saturated or unsaturated ring structure, and the total number of carbon atoms of two $R^{13}$ is 4 to 24. $R^{13}$ is preferably a saturated hydrocarbon group which may contain an oxygen atom or a saturated or unsaturated ring structure, and the number of carbon atoms thereof is preferably 1 to 18, more preferably 1 to 10. The total number of carbon atoms of two $R^{13}$ is preferably 5 to 19, more preferably 5 to 16, particularly preferably 5 to 13.

In the group (4), when m is 2, specific examples include a group (31-a) expressed by the following formula (31-a) in which both the two $R^{13}$ are a linear saturated hydrocarbon group, a group (31-b) in which one is linear and the other is branched and the both are a saturated hydrocarbon group, and a group (31-c) in which the both are a branched saturated hydrocarbon group. In any of these cases, an oxygen atom or a saturated or unsaturated ring structure may be contained between carbon atoms, similarly to that described when m is 1.

(31-a)

In the formula (31-a), k1 and k2 are independently 0 to 22 and k1+k2=2 to 22, k1 and k2 may either be the same or different. k1 and k2 are each preferably 0 to 14, more preferably 1 to 10. Further, k1+k2 is preferably 3 to 14, more preferably 3 to 10.

An example of the group (31-b) is a group in which one $R^{13}$ is linear and represented by —(CH$_2$)$_{k3}$—CH$_3$ (k3=0 to 20), the other $R^{13}$ is branched and has 3 to 23 carbon atoms, and the total number of carbon atoms of two $R^{13}$ is 4 to 24.

In the group (31-b), k3 of —(CH$_2$)$_{k3}$—CH$_3$ representing the linear $R^{13}$ is preferably 1 to 10, more preferably 2 to 8. As example of the branched $R^{13b}$ is $R^{13b}$ having 2 to 7 carbon atoms in a main chain and having one to five methyl groups or ethyl groups, preferably a methyl group as a side chain. The number of side chains is preferably one per one carbon atom excluding terminals. A terminal of $R^{13b}$ is preferably —C(CH$_3$)$_3$. Specifically, the $R^{13b}$ is preferably 1-methyl ethyl group, 1-methyl propyl group, 2-methyl propyl group, 1,1-dimethyl ethyl group, 1-methyl butyl group, 2-methyl butyl group, 1,3,3-trimethyl butyl group, 1,2,2-trimethyl butyl group, 3,5,5-trimethyl hexyl group, or the like.

An example of a preferred combination of the linear $R^{13}$ and the branched $R^{13b}$ in the group (31-b) is a combination of —$(CH_2)_{k3}$—$CH_3$ (k3=1 to 10) and one selected from 3,5,5-trimethyl hexyl group and 1,3,3-trimethyl butyl group.

An example of the group (31-c) is a group having two branched $R^{13b}$ described above in the group (31-b). An example of a preferred combination of two $R^{13b}$ is a combination of two selected from 1-methyl butyl group, 2-methyl butyl group, 1,3,3-trimethyl butyl group and 3,5,5-trimethyl hexyl group.

When $R^4$ is the group (4) of m=3, three $R^{13}$ are a linear or branched saturated hydrocarbon group having 1 to 22 carbon atoms which may each independently contain an oxygen atom, or a saturated or unsaturated ring structure, and the total number of carbon atoms of three $R^{13}$ is 4 to 24. In this case, the number of carbon atoms of $R^{13}$ is preferably 1 to 14, and the total number of carbon atoms of three $R^{13}$ is preferably 5 to 18.

In the group (4), when m is 3, specific examples include a group (32-a) expressed by the following formula (32-a) in which all the three $R^{13}$ are linear saturated hydrocarbon groups, a group (32-b) in which two are linear and one is branched and they are all saturated hydrocarbon groups, a group (32-c) in which one is linear and two are branched and they are all saturated hydrocarbon groups, and a group (32-d) in which three are branched saturated hydrocarbon groups. In any of these cases, an oxygen atom or a saturated or unsaturated ring structure may be contained between carbon atoms, similarly to that described when m is 1.

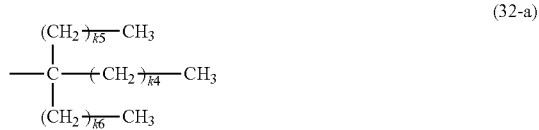

(32-a)

In the formula (32-a), k4 to k6 are independently 0 to 21, and k4+k5+k6=1 to 21. k4 to k6 may either be the same or different. When k5 and k6 are both 0, k4 is preferably 2 to 21 in order to increase solubility to the organic solvent and resin. Further, when k5 and k6 are both 1 or more, k4 is preferably 1 to 10 and k4≠k5≠k6 to make the symmetry low, in order to increase solubility to the organic solvent and resin.

The group (32-a) is preferably a group in which k5 and k6 are both 0 and k4 is 2 to 13. Further, —$(CH_2)_{k4}$—$CH_3$ in this case may be a group in which the terminal is —O-Ph ($CH_3$)—$CH_3$ instead of —$CH_3$.

A linear $R^{13}$ in the group (32-b) and the group (32-c) can be similar to —$(CH_2)_{k4}$—$CH_3$ (k4=0 to 19) in the group (32-a). The branched $R^{31b}$ in the group (32-b), the group (32-c), and the group (32-d) can be similar to the branched $R^{31b}$ described above in the group (31-b).

As the $R^4$ in the dye (A1), preferred groups are groups represented by following formulas (1a), (1b) as the group of m=1, groups represented by following formulas (2a) to (2e) as the group of m=2, and groups represented by following formulas (3a) to (3e) as the group of m=3, in the group (4). Among them, the groups (1b), (2a) to (2e), and (3b) are particularly preferred.

(1a)

(1b)

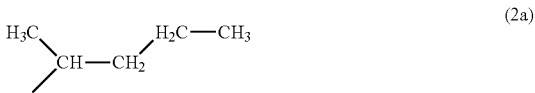

(2a)

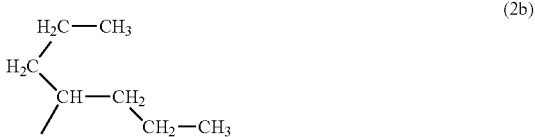

(2b)

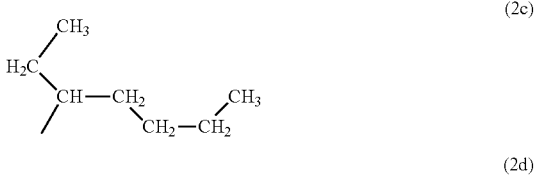

(2c)

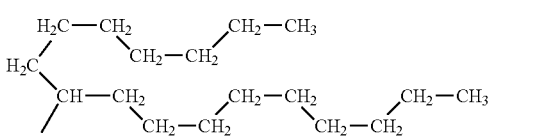

(2d)

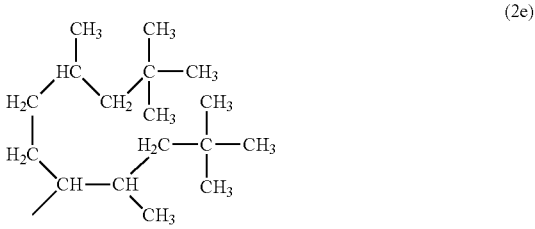

(2e)

(3a)

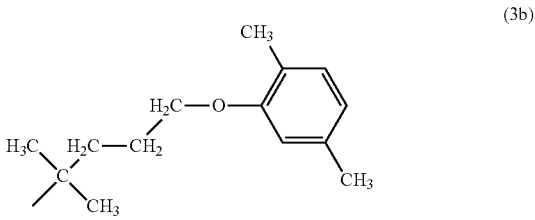

(3b)

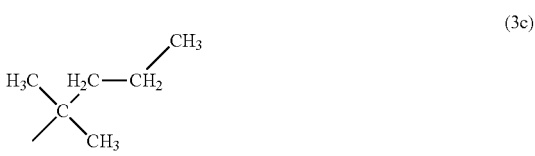

(3c)

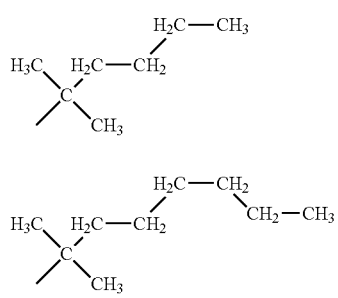

(3d)

(3e)

The dye (A1) can be produced by a conventionally publicly known method, for example, a method described in U.S. Pat. No. 5,543,086. Specifically, the dye (A1) can be produced by causing a reaction of 3,4-dihydroxy-3-cyclobutene-1,2-dione (hereinafter also referred to as a squaric acid) with a compound having a condensed ring which can form the structure represented by the formula (A1) by bonding to the squaric acid. For example, when the dye (A1) is a bilaterally symmetrical structure, it is just necessary to cause a reaction of the chemical compound with equivalent weight of 2 having a condensed ring of a desired structure in the above range with the squaric acid with equivalent weight of 1.

Hereinafter, as a specific example, a reaction path when the dye (A11) is obtained will be described as a specific example. The squaric acid is represented by (s) in the following reaction formula (F1). According to the reaction formula (F1), an amino group is introduced (f) into a benzene ring of a compound (d) having desired substituents ($R^1$ to $R^3$) in an indole skeleton, and a carboxylic acid chloride (g) having a desired substituent $R^4$ is brought to react therewith, thereby obtaining an amide compound (h), The amide compound (h) with equivalent weight of 2 is brought to react with the squaric acid (s) with equivalent weight of 1, thereby obtaining the dye (A11).

(F1)

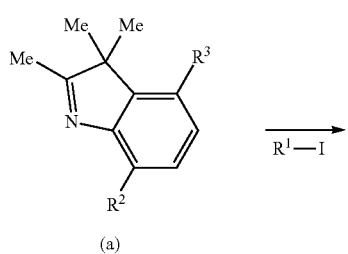

(a)

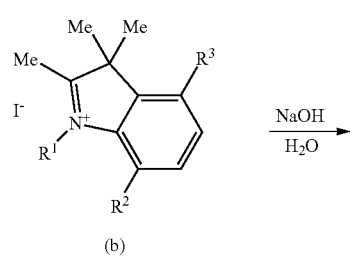

(b)

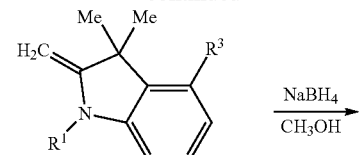

(c)

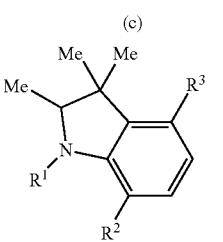

(d)

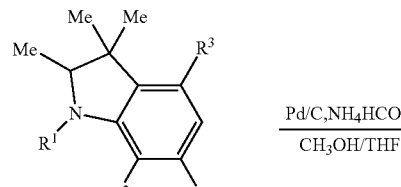

(e)

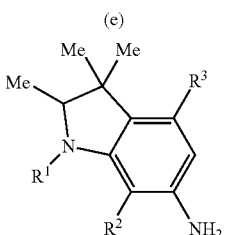

(f)

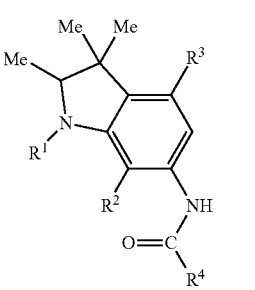

(h)

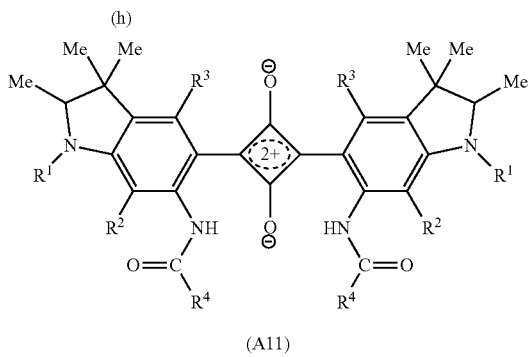

(A11)

In the reaction formula (F1), $R^1$ to $R^4$ are of the same meaning as in the formula (A1), Me represents a methyl group and THF represents a tetrahydrofuran. Hereinafter, in this description, Me and THF are used by the same meanings as described above.

In the present invention, as the dye (A1), one selected from the dyes represented by the above formula (A1) may be used solely, or two or more therefrom may be used in combination. Further, it is also possible to use a near-infrared absorbing dye other than them together with the dye (A1) as necessary within a range not impairing the effect of steepness of light absorption curve in the near-infrared region. The dye (A) is preferred to be substantially constituted only of a dye (A1), and use of one of dyes (A1) is more preferred.

(Transparent Resin (B))

The near-infrared absorbing layer used in the present filter contains the dye (A) and the transparent resin (B) having a refractive index of 1.45 or more. The refractive index of the transparent resin (B) is preferably 1.5 or more, more preferably 1.6 or more. Although there is no particular upper limit on the refractive index of the transparent resin (B), an example thereof is about 1.72 due to easiness of obtainment or the like.

Further, the glass transition temperature (Tg) of the transparent resin (B) is preferably 0 to 380° C., more preferably 40 to 370° C., furthermore preferably 100° C. to 360° C. When the glass transition temperature (Tg) of the transparent resin (B) is within the above range, deterioration or deformation due to heat can be suppressed in the above range.

The transparent resin (B) is not particularly limited as long as it is a transparent resin having a refractive index of 1.45 or more. Specific examples include acrylic resin, epoxy resin, ene-thiol resin, polycarbonate resin, polyether resin, polyarylate resin, polysulfone resin, polyethersulfone resin, polyparaphenylene resin, polyarylene ether phosphine oxide resin, polyimide resin, polyamide-imide resin, polyolefin resin, cyclic olefin resin, polyester resin, or the like having a refractive index of 1.45 or more. One of these resins may be used solely or two or more thereof may be mixed and used as long as the refractive index in the entire transparent resin is 1.45 or more.

Among the above-described ones, the transparent resin is preferably acrylic resin, polyether resin, polyester resin, polycarbonate resin, ene-thiol resin, epoxy resin, or cyclic olefin resin from the viewpoint of solubility of the dye (A1) to the transparent resin (B) and transparency. The polyester resin is preferably polyethylene terephthalate resin, polyethylene naphthalate resin, or the like. The transparent resin is more preferably acrylic resin, polyester resin, polycarbonate resin, or cyclic olefin resin. Further, in an application which requires heat resistance, polyester resin or polycarbonate resin having high Tg is preferred.

The transparent resin (B) may be a polymer alloy made by combining plural different polymers as long as its refractive index is 1.45 or more.

The transparent resin (B) may be used by adjusting the refractive index within the above range by adjusting molecular structures of material components, or the like. Specifically, one example is to have a specific structure in a main chain or a side chain of a polymer of a material component. The structure included in the polymer is not particularly limited, but for example, there is a fluorene skeleton expressed by the following formula (B1). Note that among fluorene skeletons, 9,9-bisphenylfluorene skeleton expressed by the following formula (B2) is preferred from the point that a higher refractive index and higher heat resistance can be obtained.

A commercially available product may be used as the transparent resin (B). The transparent resin (B) is preferably a resin which has a refractive index of 1.45 or more and does not accompany heat deterioration or deformation of resin when a dielectric multilayer film is formed by high-temperature vapor deposition performed at a vapor deposition temperature of 100° C. or more. Further, a resin which does not cause deterioration of dye in a process formation at 150° C. or more is preferred. Specific examples of such an acrylic resin include a resin obtained by curing OGSOL EA-F5003 (product name, made by Osaka Gas Chemicals Co., Ltd., refractive index: 1.60) or a thermoplastic acrylic resin such as BR50 (refractive index: 1.56) and BR52 (product name, made by Mitsubishi Rayon Co., Ltd.).

Further, examples of commercial products of the polyester resin include OKPH4HT (refractive index: 1.64), OKPH4 (refractive index: 1.61), B-OKP2 (refractive index: 1.64), which are made by Osaka Gas Chemicals Co., Ltd., and VYLON 103 (made by TOYOBO CO., LTD., refractive index: 1.55), and examples of the polycarbonate resin include LeXan ML 9103 (made by sabic, refractive index 1.59), SP3810 (made by Teijin Chemicals Ltd., refractive index 1.63), SP1516 (made by Teijin Chemicals Ltd., refractive index 1.60), TS2020 (made by Teijin Chemicals Ltd., refractive index 1.59), EP5000 (MITSUBISHI GAS CHEMICAL COMPANY, INC., refractive index 1.63), and Panlite AM-8 series (made by Teijin Chemicals Ltd.). An example of the polymer alloy is xylex 7507 (made by sabic) which is an alloy of a polycarbonate and a polyester.

Further, a cyclic olefin polymer having high Tg may be used. Examples of commercial products include ARTON (product name, made by JSR Corporation, refractive index 1.51, Tg 165° C.), ZEONEX (product name, made by ZEON CORPORATION, refractive index 1.53, Tg 138° C.).

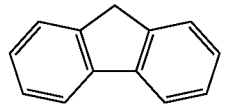

(B1)

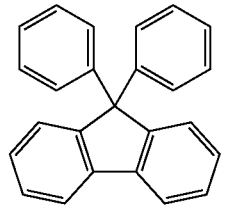

(B2)

As the resin having the fluorene skeleton or 9,9-bisphenylfluorene skeleton, acrylic resin, polycarbonate resin, polyether resin and polyester resin are preferred. Further, the fluorene skeleton may be contained in these resins by copolymerization. From the viewpoint of heat resistance, availability, and transparency, polycarbonate resin and polyester resin are particularly preferred.

An example of the acrylic resin having the fluorene skeleton is an acrylic resin obtained by performing polymerization of material components including a 9,9-bisphenylfluorene derivative, which is obtained by introducing one substituent having a (metha)acryloyl group at a terminal into each of at least two phenyl groups of 9,9-bisphenylfluorene. Note that the "(metha)acryloyl . . . " in this description is a general term of "methacryloyl . . . " and "acryloyl . . . ".

Further, an acrylic resin may be used which is obtained by polymerizing a compound in which a hydroxyl group is introduced into a 9,9-bisphenylfluorene derivative having the (metha)acryloyl group with an urethane (metha)acrylate compound. Examples of the urethane (metha)acrylate compound include a compound obtained as a reaction product of a (metha)acrylate compound having a hydroxyl group and a polyisocyanate compound, a compound obtained as a reaction product of a (metha)acrylate compound having a hydroxyl group, a polyisocyanate compound, and a polyol compound.

An example of the polyester resin in which the fluorene skeleton is introduced is a polyester resin in which a 9,9-bisphenylfluorene derivative expressed by the following formula (B2-1) is introduced as an aromatic diol. In this case, the kind of dicarboxylic acid to be reacted with the aromatic diol is not particularly limited. Such a polyester resin is preferably used as the transparent resin (B) from the point of refractive index and transparency in the visible light region.

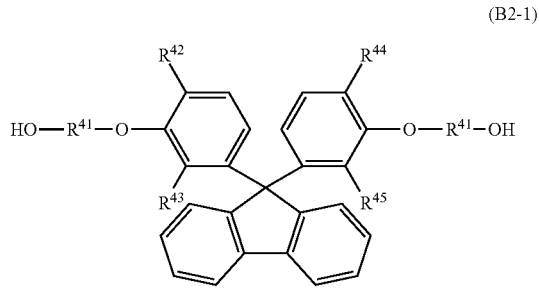

(B2-1)

(Here, in the formula (B2-1), $R^{41}$ is an alkylene group having 2 to 4 carbon atoms; $R^{42}$, $R^{43}$, $R^{44}$ and $R^{45}$ each independently represent a hydrogen atom, a saturated hydrocarbon group having 1 to 7 carbon atoms, or an aryl group having 6 to 7 carbon atoms.)

(Near-Infrared Absorbing Layer)

The near-infrared absorbing layer which the present filter has is a layer containing a dye (A) and a transparent resin (B) having a refractive index of 1.45 or more, and the dye (A) contains one or more dyes (A1).

A preferred near-infrared absorbing layer which the present filter has contains a dye (A) and a transparent resin (B) satisfying the following conditions. That is, in the near-infrared absorbing layer, when the dye (A) is contained by an amount satisfying the following conditions (ii-1) and (ii-2), it is preferred that transmittance of the near-infrared absorbing layer satisfies the following condition (ii-3).

(ii-1) a shortest wavelength $\lambda_a$ with transmittance of 1% in the wavelength region of 650 nm to 800 nm is 675 nm$\leq \lambda_a \leq$720 nm.

(ii-2) a relation between a longest wavelength $\lambda_b$ with transmittance of 1% in the wavelength region of 650 nm to 800 nm and the $\lambda_a$ is $\lambda_b - \lambda_a = 30$ nm.

(ii-3) a relation of a wavelength $\lambda_c$ with transmittance of 70% on a shorter wavelength side than the $\lambda_a$ in the wavelength region of 650 nm to 800 nm, the $\lambda_a$, and the refractive index $n_d(B)$ of the transparent resin (B) is $n_d(B) \times (\lambda_a - \lambda_c) \leq 115$.

In addition, the wavelength range of $\lambda_a$ in the (ii-1) is preferably 680 nm$\leq \lambda_a \leq$720 nm.

Further, the transmittance of the near-infrared absorbing layer can be measured by using an ultraviolet visible light spectrophotometer. For example, when the near-infrared absorbing layer is provided on a glass substrate, the transmittance is calculated by subtracting the transmittance of only the glass substrate. Note that the transmittance of light of the near-infrared absorbing layer refers to, unless otherwise stated, a ratio to light incident from a direction orthogonal to a main surface of a sample, the ratio of this light traveling straight inside the sample and transmitted to an opposite side. Further, when the transmittance is measured by making light incident from a direction other than the direction orthogonal to the main surface of the sample in the measurement of transmittance of light, an angle made by a straight line indicating the direction of the incident light to a line orthogonal to the main surface is called an incident angle.

When the near-infrared absorbing layer is produced so that the dye (A) is contained by an amount which satisfies the conditions (ii-1) and (ii-2), the dye (A) which enables this layer to satisfy the condition (ii-3) is a preferred dye for the NIR filter, That is, when the near-infrared absorbing layer containing the dye (A) which satisfies the above conditions and the selected wavelength shielding member, particularly the dielectric multilayer film, are used in combination, it is preferred because angle dependency which the dielectric multilayer film has can be sufficiently eliminated. Further, when used as an NIR filter of a digital still camera, a digital video camera, or the like, it is preferred because the use efficiency of light in the visible light wavelength region can be improved while shielding light in the near-infrared wavelength region. Thus, it is advantageous in terms of noise suppression in imaging of a dark region.

In the condition (ii-3), the value calculated by $n_d(B) \times (\lambda_a - \lambda_c)$ (hereinafter, this value may also be described as "$I_s$ value") is a value to be an index indicating steepness of the absorption curve in the vicinity of the boundary between the visible light region and the near-infrared region with respect to a transmission spectrum of the near-infrared absorbing layer. When this value is 115 or less, the absorption curve in the vicinity of the boundary between the visible light region and the near-infrared region is steep with respect to the near-infrared absorbing layer, which can be said as preferable for the NIR filter.

That is, with respect to the transmission spectrum of the near-infrared absorbing layer, the smaller the difference $(\lambda_a - \lambda_c)$ between the shortest wavelength $\lambda_a$ with transmittance of 1% in the region of 650 nm to 800 nm and the wavelength $\lambda_c$ with transmittance of 70% on a shorter wavelength side than the $\lambda_a$, the steeper the absorption curve in the vicinity of the boundary between the visible light region and the near-infrared region. Here, $\lambda_a - \lambda_c$ also depends on a wavelength width having transmittance of 1% or less ($\lambda_b - \lambda_a$; $\lambda_b$ is the longest wavelength with transmittance of 1% in the wavelength region of 650 nm to 800 nm). Accordingly, in order to compare and evaluate the steepness of the absorption curve in the above region of the transmission spectrum of the near-infrared absorbing layer, $\lambda_b - \lambda_a$ is fixed to 30 nm. That is, $\lambda_b - \lambda_a$ of the near-infrared absorbing layer which the present filter has is not limited to 30 nm.

Further, in the $I_s$ value, $(\lambda_a - \lambda_c)$ is multiplied by the refractive index $n_d(B)$ of the transparent resin (B) contained in the near-infrared absorbing layer as a coefficient. This is to standardize the difference in steepness among resins.

Figure 2:
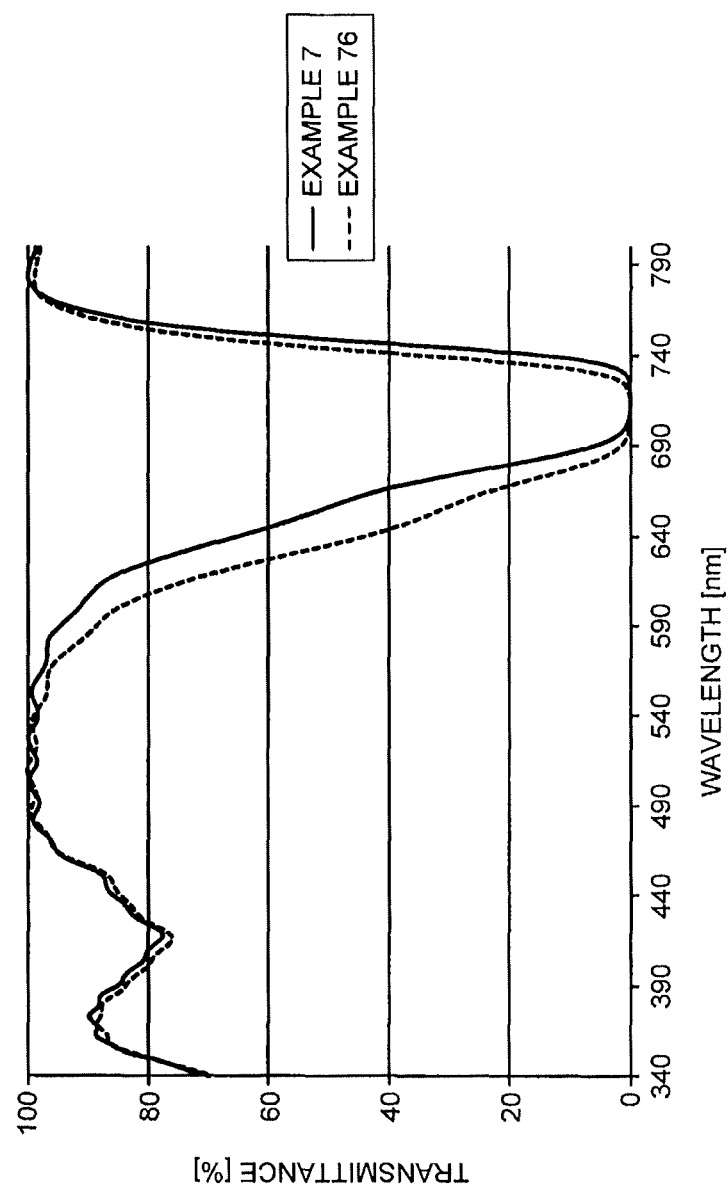
FIG. 2 is a chart illustrating transmission spectra of near-infrared absorbing layers in an example of the present invention and a comparative example.
Figure 3:
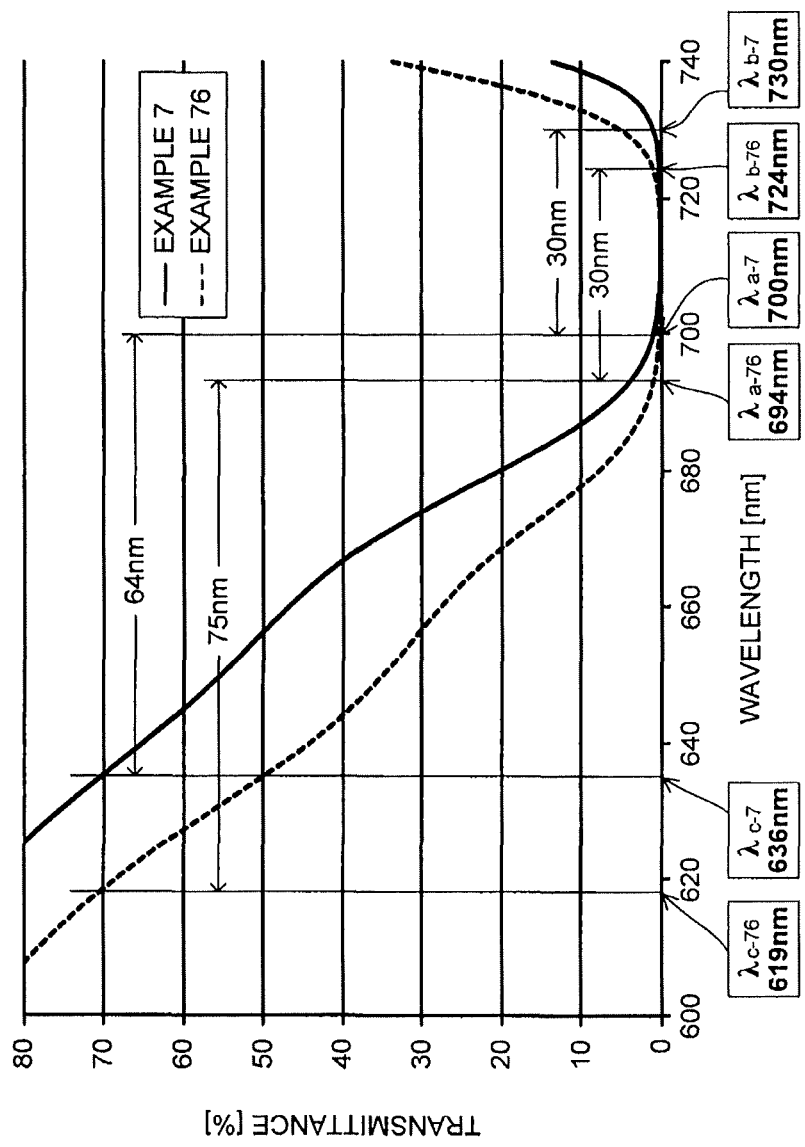
FIG. 3 is a chart illustrating in enlargement a near-infrared wavelength region of the transmission spectra of FIG. 2.

The transmission spectrum of the near-infrared absorbing layer will be described specifically with FIG. 2 and FIG. 3. A solid line in FIG. 2 indicates the transmission spectrum of the wavelength region 340 nm to 800 nm of the near-infrared absorbing layer constituted of the dye (A11-7) and polyester resin (refractive index 1.64) of an example (Example 7). A solid line of FIG. 3 is an enlarged chart of 600 nm to 740 nm of the transmission spectrum illustrated in FIG. 2. As illustrated in FIG. 2 and FIG. 3, in the transmission spectrum of the near-infrared absorbing layer, the shortest wavelength $\lambda_{a\text{-}7}$ ($\lambda_a$ in the case of Example 7 is described as $\lambda_{a\text{-}7}$. The same applies to $\lambda_b$, $\lambda_c$, $I_s$ below) with transmittance of 1% in the wavelength region of 650 nm to 800 nm is 700 nm, and the longest wavelength $\lambda_{b\text{-}7}$ with transmittance of 1% in the wavelength region of 650 nm to 800 nm in this transmission spectrum is 730 nm, and the difference thereof $\lambda_{b\text{-}7}-\lambda_{a\text{-}7}$ is 30 nm. Further, the wavelength $\lambda_{c\text{-}7}$ with transmittance of 70% on a shorter wavelength side than the $\lambda_{a\text{-}7}$ is 636 nm, the difference thereof $\lambda_{a\text{-}7}-\lambda_{c\text{-}7}$ is 64 nm, and an $I_{s\text{-}7}$ value calculated from this and the above refractive index ($n_d(B)$) 1.64 is 105.0.

On the other hand, in FIG. 2 and FIG. 3, a dashed line indicates the transmission spectrum of the near-infrared absorbing layer constituted of the dye (A11-20) and polyester resin (refractive index 1.64) of a comparative example (Example 76). In this case, $\lambda_{a\text{-}76}$ is 694 nm, $\lambda_{b\text{-}76}$ is 724 nm, $\lambda_{c\text{-}76}$ is 619 nm, $\lambda_{b\text{-}76}-\lambda_{a\text{-}76}=30$ nm, $\lambda_{a\text{-}76}-\lambda_{c\text{-}76}=75$ nm, and $I_{s\text{-}76}$ value is 123.0.

In the condition (ii-3), in order to increase steepness of the inclination of the light absorption curve in the vicinity of the boundary between the visible light region and the near-infrared region with respect to the transmission spectrum of the near-infrared absorbing layer, $n_d(B)\times(\lambda_a-\lambda_c)$ is preferably 110 or less.

The film thickness of the near-infrared absorbing layer is not particularly limited, and is determined appropriately according to an application, that is, arrangement space in a device to be used and a required absorbing property, and the like. The film thickness is preferably 0.1 µm to 100 µm. When the film thickness is less than 0.1 µm, there is a concern that near-infrared absorbing performance is not exhibited sufficiently. Further, when the film thickness exceeds 100 µm, flatness of the film decreases, and there is a concern that dispersion in absorptance occurs. The film thickness is more preferably 0.5 µm to 50 µm. When it is in this range, both the sufficient near-infrared absorbing performance and the flatness of film thickness can be achieved.

The higher the solubility to the transparent resin (B) of the dye (A), desired optical performance can be maintained even when the near-infrared absorbing layer is made thin. That is, the higher the solubility, the more the degree of freedom in design of the film thickness of the near-infrared absorbing layer increases. Here, the dye (A1) has high solubility to the transparent resin (B). Thus, the larger the content of the dye (A1), the higher the solubility of the dye (A) to the transparent resin (B). The content of the dye (A1) in the near-infrared absorbing layer is preferably 0.1 to 20 parts by mass, more preferably 1 to 15 parts by mass to 100 parts by mass of the transparent resin (B).

The near-infrared absorbing layer may contain various optional components which the near-infrared absorbing layer normally contains, as necessary within the range not inhibiting effects of the present invention, other than the dye (A) and the transparent resin (B). Specific examples of the optional components include a near-infrared or infrared absorbent, a color tone correcting dye, an ultraviolet absorbent, a leveling agent, an antistatic agent, a heat stabilizer, a light stabilizer, an antioxidant, a dispersing agent, a flame retardant, a lubricant, a plasticizer, and the like. The content of these optional components in the near-infrared absorbing layer is preferably 15 parts by mass or less to 100 parts by mass of the transparent resin (B) respectively. More preferably, it is 0.01 to 10 parts by mass, furthermore preferably 0.05 to 5 parts by mass thereto.

The light stabilizer is constituted of a material having a function to suppress deterioration of the dye or the transparent resin by light, and is an optional component preferred to be contained for suppressing deterioration of the dye (A) or the transparent resin (B) in the near-infrared absorbing layer. Specific examples of the light stabilizer include a heavy metal inactivating agent, an ultraviolet absorbent, and a quencher, and the like.

The heavy metal inactivating agent is a material which stabilizes metal ions by a chelate, so as to suppress generation of radicals from the metal ions by light irradiation. In the near-infrared absorbing layer, for example, when radicals are generated from metal ions which are brought in together with the transparent resin (B), there is a concern that the dye (A) or the transparent resin (B) is deteriorated by them. The heavy metal inactivating agent is contained as an optional component in order to suppress this deterioration. Specific examples of the heavy metal inactivating agent are compounds of hydrazide-based and amide-based.

For the ultraviolet absorbent, a material having a maximum absorption wavelength in the ultraviolet region of 400 nm or less and stable to heat and light is preferred. In general, an organic compound dye and a resin are liable to deteriorate by ultraviolet rays. Accordingly, from the viewpoint of suppressing deterioration of the dye (A) and the transparent resin (B) by ultraviolet rays, containing the ultraviolet absorbent in the near-infrared absorbing layer is preferred. A preferred example of the ultraviolet absorbent is a compound of benzotriazole-based, benzophenone-based, salicylate-based, cyanoacrylate-based, triazine-based, okizanirido-based, nickel complex salt-based, or inorganic-based. Examples of the inorganic-based ultraviolet absorbent are particles of zinc oxide, titanium oxide, cerium oxide, zirconium oxide, mica, kaolin, sericite, and the like.

An example of the compound of benzotriazole-based is TINUVIN 928 (made by Ciba), or the like. An example of the compound of triazine-based is TINUVIN 400 (made by Ciba), TINUVIN 405 (made by Ciba), TINUVIN 460 (made by Ciba), or TINUVIN 479 (made by Ciba).

The quencher is a compound which supplements singlet oxygen which occurs by light irradiation, and examples thereof include organometallic complex and amine-based compound, and the like. When the near-infrared absorbing layer contains the quencher, it is preferred because deterioration of the dye (A) and the transparent resin (B) by the singlet oxygen can be suppressed.

Examples of the organometallic complex of the quencher include a nickel complex compound, copper complex compound, cobalt complex compound and zinc complex compound, and the like.

Examples of the nickel complex compound include nickel-bis(octylphenyl)sulfide, nickel complex-3,5-di-tert-butyl-4-hydroxybenzyl phosphate monoethylate, and nickel dibutyldithiocarbamate.

An example of the zinc complex compound is a Zn(II)bis (diisopropyldithiocarbamate).

A preferred example of the organometallic complex of the quencher is a metal complex of benzenedithiol expressed by the following formula (X1).

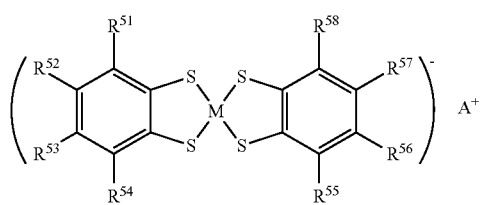

(X1)

In the above (X1), M is transition metal, $A^+$ is a quaternary ammonium cation or a quaternary phosphonium cation, and $R^{51}$ to $R^{58}$ are each independently a hydrogen atom, a halogen atom, an alkyl group having 1 to 6 carbon atoms or $—SO_2R^6$.

Examples of the transition metal include nickel, cobalt, and copper.

Examples of the quaternary ammonium cation of $A^+$ include a tetraethylammonium cation and a tetrabutylammonium cation, and the like. Examples of the quaternary phosphonium cation of $A^+$ include a tetraethylphosphonium cation and a tetrabutylphosphonium cation, and the like.

Examples of $R^6$ of the $—SO_2R^6$ include a group selected from a monovalent group represented by following formulas (Y1) to (Y7) and a phenyl group.

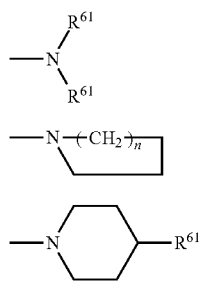

(Y1)

(Y2)

(Y3)

(Y4)

(Y5)

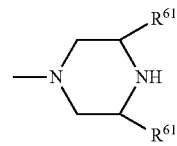

(Y6)

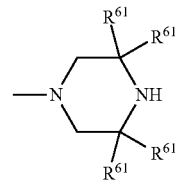

(Y7)

In the formulas (Y1) to (Y7), $R^{61}$ is each independently an alkyl group having 1 to 4 carbon atoms, an aryl group having 6 to 10 carbon atoms, or a monovalent 5 to 7 membered heterocyclic ring group (pyrimidyl group, or the like) containing a nitrogen atom as a hetero atom. n is an integer of 3 to 5. Z is an oxygen atom, a sulfur atom or an NH group. Note that a description regarding a hydrogen atom which is bonded to a carbon atom in a cyclo ring is omitted excluding the formula (Y2).

Specific examples of the metal complex of benzenethiol represented by the formula (X1) include compounds represented in the following table 1.

TABLE 1

| Com. No. | $R^{51}$ | $R^{52}$ | $R^{53}$ | $R^{54}$ | $R^{55}$ | $R^{56}$ | $R^{57}$ | $R^{58}$ | M | $A^+$ |
|---|---|---|---|---|---|---|---|---|---|---|
| 1 | Cl | Cl | H | Cl | Cl | H | Cl | Cl | Ni | Tetrabutyl |
| 2 |  | $CH_3$ |  |  |  | $CH_3$ |  |  | Ni | ammonium |
| 3 |  | H |  |  |  | H |  |  | Cu | cation |
| 4 |  | $CH_3$ |  |  |  | $CH_3$ |  |  | Cu |  |
| 5 |  | H |  |  |  | H |  |  | Co |  |
| 6 |  | $CH_3$ |  |  |  | $CH_3$ |  |  | Co |  |
| 7 |  | H |  |  |  | H |  |  | Ni | Tetrabutyl |
| 8 |  | $CH_3$ |  |  |  | $CH_3$ |  |  | Ni | phosphonium |
| 9 |  | H |  |  |  | H |  |  | Cu | cation |
| 10 |  | $CH_3$ |  |  |  | $CH_3$ |  |  | Cu |  |
| 11 |  | H |  |  |  | H |  |  | Co |  |
| 12 |  | $CH_3$ |  |  |  | $CH_3$ |  |  | Co |  |
| 13 | H | H | Formula (Y11) | H | H | H | Formula (Y11) | H | Ni | Tetrabutyl |
| 14 |  |  |  |  |  |  |  |  | Cu | ammonium |
| 15 |  |  |  |  |  |  |  |  | Co | cation |
| 16 |  |  |  |  |  |  |  |  | Ni | Tetrabutyl |
| 17 |  |  |  |  |  |  |  |  | Cu | phosphonium |
| 18 |  |  |  |  |  |  |  |  | Co | cation |
| 19 | H | H | Formula (Y21) | H | H | H | Formula (Y21) | H | Ni | Tetrabutyl |
| 20 |  |  |  |  |  |  |  |  | Cu | ammonium |
| 21 |  |  |  |  |  |  |  |  | Co | cation |
| 22 |  |  |  |  |  |  |  |  | Ni | Tetrabutyl |
| 23 |  |  |  |  |  |  |  |  | Cu | phosphonium |
| 24 |  |  |  |  |  |  |  |  | Co | cation |
| 25 | H | H | Formula (Y41) | H | H | H | Formula (Y41) | H | Ni | Tetrabutyl |
| 26 |  |  |  |  |  |  |  |  | Cu | ammonium |
| 27 |  |  |  |  |  |  |  |  | Co | cation |

TABLE 1-continued

| Com. No. | $R^{51}$ | $R^{52}$ | $R^{53}$ | $R^{54}$ | $R^{55}$ | $R^{56}$ | $R^{57}$ | $R^{58}$ | M | $A^+$ |
|---|---|---|---|---|---|---|---|---|---|---|
| 28 | | | | | | | | | Ni | Tetrabutyl |
| 29 | | | | | | | | | Cu | phosphonium |
| 30 | | | | | | | | | Co | cation |
| 31 | H | H | Formula (Y42) | H | H | H | Formula (Y42) | H | Ni | Tetrabutyl |
| 32 | | | | | | | | | Cu | ammonium |
| 33 | | | | | | | | | Co | cation |
| 34 | | | | | | | | | Ni | Tetrabutyl |
| 35 | | | | | | | | | Cu | phosphonium |
| 36 | | | | | | | | | Co | cation |
| 37 | H | H | Formula (Y01) | H | H | H | Formula (Y01) | H | Ni | Tetrabutyl |
| 38 | | | | | | | | | Cu | ammonium |
| 39 | | | | | | | | | Co | cation |
| 40 | | | | | | | | | Ni | Tetrabutyl |
| 41 | | | | | | | | | Cu | phosphonium |
| 42 | | | | | | | | | Co | cation |
| 43 | H | H | Formula (Y51) | H | H | H | Formula (Y51) | H | Ni | Tetrabutyl |
| 44 | | | | | | | | | Cu | ammonium |
| 45 | | | | | | | | | Co | cation |
| 46 | | | | | | | | | Ni | Tetrabutyl |
| 47 | | | | | | | | | Cu | phosphonium |
| 48 | | | | | | | | | Co | cation |
| 49 | H | H | Formula (Y61) | H | H | H | Formula (Y61) | H | Ni | Tetrabutyl |
| 50 | | | | | | | | | Cu | ammonium |
| 51 | | | | | | | | | Co | cation |
| 52 | | | | | | | | | Ni | Tetrabutyl |
| 53 | | | | | | | | | Cu | phosphonium |
| 54 | | | | | | | | | Co | cation |
| 55 | H | H | Formula (Y52) | H | H | H | Formula (Y52) | H | Ni | Tetrabutyl |
| 56 | | | | | | | | | Cu | ammonium |
| 57 | | | | | | | | | Co | cation |
| 58 | | | | | | | | | Ni | Tetrabutyl |
| 59 | | | | | | | | | Cu | phosphonium |
| 60 | | | | | | | | | Co | cation |
| 61 | H | H | Formula (Y53) | H | H | H | Formula (Y53) | H | Ni | Tetrabutyl |
| 62 | | | | | | | | | Cu | ammonium |
| 63 | | | | | | | | | Co | cation |
| 64 | | | | | | | | | Ni | Tetrabutyl |
| 65 | | | | | | | | | Cu | phosphonium |
| 66 | | | | | | | | | Co | cation |

Incidentally, "Com. No." in Table 1 means compound number. Formulas (Y01) to (Y61) in Table 1 represent groups represented by following formulas (Y01) to (Y61), respectively.

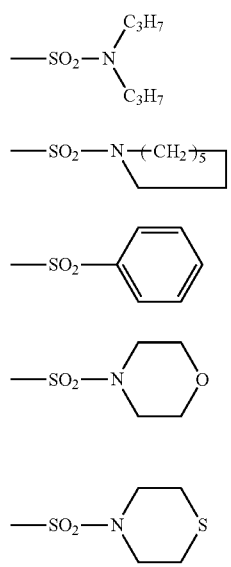

An example of the amine-based compound of the quencher is a bisiminium salt expressed by the following formula (X2) or a following formula (X3).

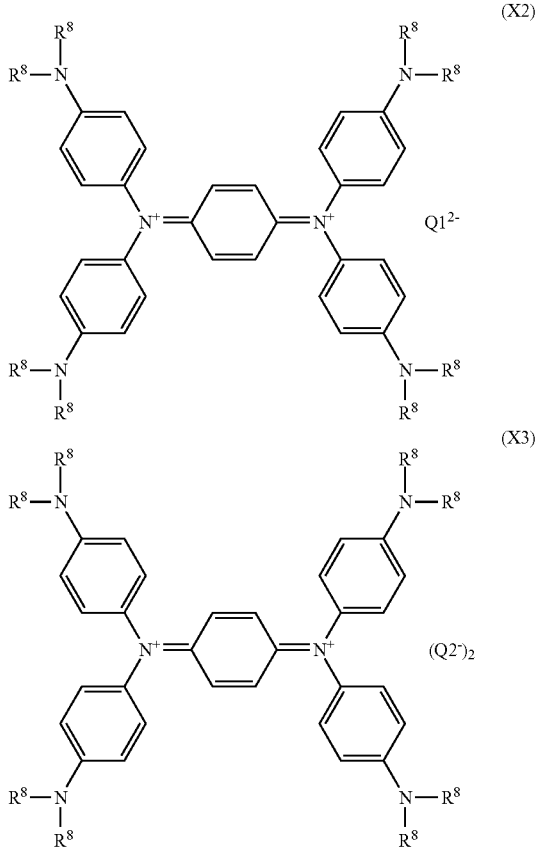

In the above formulas (X2) and (X3), $R^8$ each independently represents an alkyl group having 1 to 10 carbon atoms which may have a branch, and $Q1^{2-}$ represents a bivalent anion and $Q2^-$ represents a monovalent anion.

An example of another compound which functions as the quencher is a nitroso compound expressed by the following formula (X4).

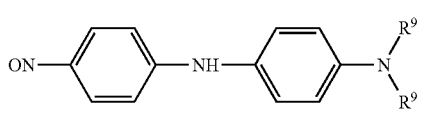

In the above formula (X4), $R^9$ each independently represents an alkyl group having 1 to 4 carbon atoms.

As the near-infrared and infrared absorbent, one is used which does not impair the effect of steepness of light absorption curve in the near-infrared region by the dye (A1). As such a near-infrared and infrared absorbent, inorganic particles can be used preferably, and specifically, they may be ITO (Indium Tin Oxides), ATO (Antimony-doped Tin Oxides), cesium tungstate, lanthanum boride, or the like. Among others, ITO particles and cesium tungstate particles have high transmittance in the visible wavelength region and have light absorbency in a wide range including the infrared wavelength region over 1200 nm, and thus are preferred particularly when a light shielding property of the infrared wavelength region is needed.

The number average aggregate particle size of the above inorganic particles is preferably 5 nm to 200 nm, more preferably 5 nm to 100 nm, furthermore preferably 5 nm to 70 nm, from the point of suppressing scattering and maintaining transparency. Here, in this description, the number average aggregate particle size is a value measured by using a dynamic light scattering particle size distribution analyzer from a dispersion liquid for particle size measurement in which sample particles are dispersed in a dispersion medium such as water or alcohol.

Further, the near-infrared absorbing layer may contain a component, for example, a component derived from a silane coupling agent, a theunal- or photo-polymerization initiator, a polymerization catalyst, and/or the like, to be added to a coating liquid used when forming the near-infrared absorbing layer which will be described below. The kind of the silane coupling agent to be used can be chosen appropriately depending on the transparent resin (B) to be used in combination. The content of the silane coupling agent is preferably 1 to 20 parts by mass, more preferably 5 to 15 parts by mass to 100 parts by mass of the transparent resin (B) in the coating liquid.

The near-infrared absorbing layer can be produced by, for example, applying on a substrate a coating liquid prepared by dispersing and dissolving the dye (A) and the transparent resin (B) or material components of the transparent resin (B) in a solvent, drying the coating liquid and further curing the coating liquid as necessary. By forming the near-infrared absorbing layer by such a method, it can be produced evenly with a desired film thickness. The dye (A1) has good solubility in both the transparent resin (B) and the solvent used in the coating liquid, and is also preferable from the point that evenness of the film can be secured easily. The substrate may be a transparent substrate capable of applying as a component member of the present filter or a substrate used only when the near-infrared absorbing layer is formed, for example a releasable substrate.

The solvent is not particularly limited as long as it is a dispersion medium in which the dye (A) and the transparent resin (B) or material components of the transparent resin (B) can be dispersed stably or a solvent in which they can be dissolved. Note that in this description, the term "solvent" is used as a concept including both the dispersion medium and the solvent. Specific examples of the solvent include ketones, ethers, esters, alcohols, hydrocarbons, acetonitrile, nitromethane, water, and the like. One of them may be solely used, or two or more of them may be used in combination.

The amount of the solvent is preferably 10 to 5,000 parts by mass, particularly preferably 30 to 2,000 parts by mass to 100 parts by mass of the transparent resin (B). Note that the content of non-volatile components (solid content) in the coating liquid is preferably 2 mass % to 50 mass %, particularly preferably 5 mass % to 40 mass % to the total amount of the coating liquid.

For preparing the coating liquid, a stirring device such as a magnetic stirrer, a planetary centrifugal mixer, a bead mill, a planetary mill, an ultrasonic homogenizer, or the like can be used. In order to secure high transparency, it is preferred to perform stirring sufficiently. The stirring may be performed either sequentially or intermittently, For applying the coating liquid, a coating method such as immersion coating method, cast coating method, spray coating method, spinner coating method, bead coating method, wire bar coating method, blade coating method, roller coating method, curtain coating method, slit die coater method, gravure coater method, slit reverse coater method, micro gravure method, inkjet method, or comma coater method can be used. Other than them, a bar coater method, a screen printing method, a flexographic printing method, or the like can be used.

The releasable substrate for applying the coating liquid may be in either film form or plate form, and a material thereof is not particularly limited as long as having releasability. Specifically, a glass plate, a plastic film subjected to a release treatment, for example, a film constituted of polyester resin, polyolefin resin, acrylic resin, urethane resin, vinyl chloride resin, fluorocarbon resin, polycarbonate resin, polyvinyl butyral resin, polyvinyl alcohol resin, or the like, a stainless steel plate, or the like is used.

Further, an example of a transparent substrate which becomes a component member of the present filter as it is together with the near-infrared absorbing layer obtained by applying the coating liquid on its surface and appropriately treated thereafter is a transparent substrate which will be described later.

By applying the coating liquid on these substrates and thereafter drying it, the near-infrared absorbing layer is formed on the substrate. When the coating liquid contains the material component of the transparent resin (B), curing treatment is further performed. In the case where the reaction is thermal curing, drying and curing can be performed simultaneously, but in the case of photo-curing, the curing treatment is provided separately from drying. Further, the near-infrared absorbing layer formed on the releasable substrate is released and then used for manufacturing the present filter, The near-infrared absorbing layer according to the present filter can be manufactured in a film form by extrusion molding depending on the type of the transparent resin (B), and moreover, plural films produced thus may be stacked and integrated by thermo-compression or the like.

(Near-Infrared Cut Filter)

The structure of the present filter is not particularly limited other than having the near-infrared absorbing layer. The near-infrared absorbing layer itself may independently constitute the NIR filter, or may constitute the NIR filter together with other components. Examples of other components include a transparent substrate supporting the near-infrared absorbing layer, a selected wavelength shielding layer controlling transmission and shielding of light in a particular wavelength region, and the like.

The selected wavelength shielding layer is preferred to have a wavelength selecting property to transmit light in the visible region and shield light with a wavelength other than the light shielding region of the near-infrared absorbing layer. Note that in this case, the light shielding region of the selected wavelength shielding layer may include a light shielding region in the near-infrared wavelength region of the near-infrared absorbing layer.

In the present filter, use of the selected wavelength shielding layer other than the near-infrared absorbing layer is preferred, and optical characteristics of the selected wavelength shielding layer are preferred to satisfy the following conditions of (iii-1) and (iii-2).

(iii-1) transmittance is 90% or more in the wavelength region of 420 nm to 695 nm.
(iii-2) transmittance is 2% or less in the wavelength region from the longest wavelength $\lambda_b$ with transmittance of 1% of a transmission spectrum in the wavelength region of 650 nm to 800 nm of the near-infrared absorbing layer to 1100 nm.

By satisfying the condition (iii-1), use efficiency of light in the visible light region can be increased. That is, transmittance of the visible light region is preferred to be higher, and is more preferably 95% or more.

By satisfying the condition (iii-2), the present filter can shield light in the near-infrared and infrared regions. Accordingly, incidence of near-infrared light on an imaging sensor can be suppressed, and noise can be suppressed.

Note that in the present description, regarding transmittance in a particular wavelength region, transmittance of 90% or more for example means that the transmittance in all the wavelengths in this wavelength region does not fall below 90%, and likewise, transmittance of 2% or less for example means that the transmittance in all the wavelengths in this wavelength region does not exceed 2%.

In the selected wavelength shielding layer, furthermore, transmittance of light of ultraviolet wavelength region of 400 nm or less being 1% or less is more preferred, and transmittance of light of 410 nm or less being 1% or less is particularly preferred. Further, the selected wavelength shielding layer may shield light of a predetermined wavelength region by one layer, or may shield light of the predetermined wavelength region by plural layers in combination. The selected wavelength shielding layer may be disposed only on one side of the near-infrared absorbing layer or may be disposed on both sides thereof according to the purpose of the present filter. The number of selected wavelength shielding layers to be disposed is not limited. One or more selected wavelength shielding layers may be disposed on only one side, or one or more selected wavelength shielding layers may be disposed on both sides by respective independent numbers. The order of stacks of the respective components of the present filter is not particularly limited. It is set appropriately according to the purpose of this filter.

Hereinafter, embodiments of the present filter will be described with reference to drawings.

Figure 1B:
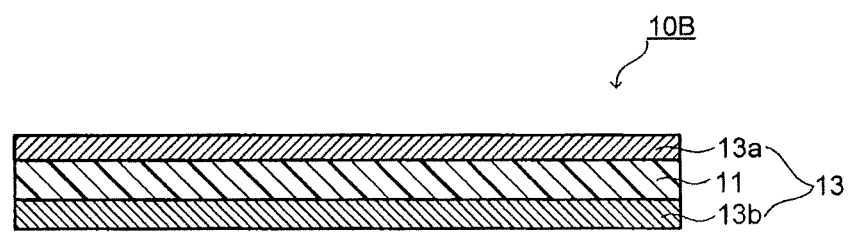
FIG. 1B is a cross-sectional view schematically illustrating another example of a near-infrared cut filter according to an embodiment of the present invention.
Figure 1C:
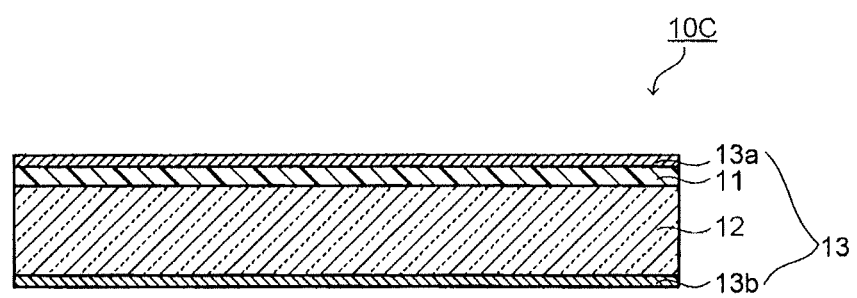
FIG. 1C is a cross-sectional view schematically illustrating still another example of a near-infrared cut filter according to an embodiment of the present invention.

FIG. 1A to FIG. 1C are cross-sectional views schematically illustrating examples of embodiments of the present filter. FIG. 1A is a cross-sectional view of an NIR filter 10A of one embodiment of the present filter having a near-infrared absorbing layer 11 on a transparent substrate 12. Further, FIG. 1B is a cross-sectional view of an NIR filter 10B of another embodiment of the present filter in which selected wavelength shielding layers 13 are disposed on both main surfaces of a near-infrared absorbing layer 11. FIG. 1C is a cross-sectional view of an NIR filter 10C of still another embodiment of the present filter in which selected wavelength shielding layers 13 are disposed on both surfaces of a structure in which a near-infrared absorbing layer 11 is formed on a transparent substrate 12.

For the structure illustrated in FIG. 1A, a method directly forming the near-infrared absorbing layer 11 on the transparent substrate 12 or a method producing a single body of film-formed near-infrared absorbing layer 11 obtained by using the releasable substrate on one of main surfaces of the film-formed or plate-formed transparent substrate 12 by adhering via a not-illustrated adhesive layer, or the like may be used. Further, as another structure, a structure in which the near-infrared absorbing layer 11 is sandwiched by two transparent substrates 12, or use of the present filter in which the near-infrared absorbing layer 11 is formed on or adhered to both main surfaces of the transparent substrate 12 may be mentioned. Further, it may be a structure in which an antireflection layer is formed on a surface of the near-infrared absorbing layer 11 or a surface of the selected wavelength shielding layer 13 formed on the near-infrared absorbing layer 11.

The shape of the transparent substrate 12 is not particularly limited, and may be block-formed, plate-formed, or film-formed. Further, a material constituting the transparent substrate 12 is not particularly limited as long as transmitting light in the visible wavelength region. Examples include crystals of crystalline quartz, lithium niobate, sapphire or the like, glass, polyester resin such as polyethylene terephthalate (PET) or polybutylene terephthalate (PBT), polyolefin resin such as polyethylene, polypropylene, or ethylene-vinyl acetate copolymer, norbomene resin, acrylic resin such as polyacrylate or polymethyl methacrylate, urethane resin, vinyl chloride resin, fluorine resin, polycarbonate resin, polyvinyl butyral resin, polyvinyl alcohol resin, or the like.

These materials may be one having an absorption property with respect to wavelengths in the ultraviolet region and/or the near-infrared region. The transparent substrate 12 may be a glass filter of absorption type in which, for example, a CuO or the like is added to a fluorophosphate-based glass or a phosphate-based glass, or the like.

Further, crystals of crystalline quartz, lithium niobate, sapphire or the like are used as a material of a low-pass filter or a wave plate for decreasing moire or false color in an imaging device such as a digital still camera, a digital video camera, a monitoring camera, an on-vehicle camera, a web camera, or the like. Use of crystals of them as the material of the transparent substrate 12 is preferred because the function of a low-pass filter or a wave plate can be added to the NIR filter 10A according to this embodiment, thereby enabling further size reduction and thickness reduction of the imaging device.

Moreover, a cover protecting the solid-state image sensing device is attached in an air-tight manner to a solid-state image sensing device of the above imaging devices or a solid-state image sensing device package. When this cover is used as the transparent substrate 12, an NIR filter usable as a cover can be obtained, which enables further size reduction and thickness reduction of the imaging device.

In the case where the transparent substrate 12 is a glass plate, the thickness of the glass plate is preferably in the range of 0.03 mm to 5 mm from the point of size reduction and thickness reduction of the device, and suppression of damage when handled, more preferably in the range of 0.05 mm to 1 mm from the point of weight reduction and strength.

When a film constituted of transparent plastic such as polyethylene terephthalate (PET) is used as the transparent substrate 12, its thickness is preferably in the range of 10 μm to 300 μm. Further, it is preferred to perform a corona treatment or an easy adhesion treatment on a surface of the film before forming the near-infrared absorbing layer 11.

When a film constituted of transparent plastic is used as the transparent substrate 12, another main surface of the transparent substrate 12 can be adhered to the glass plate via an adhesive or a bond. A similar one to those illustrated as materials of the transparent substrate 12 can be used as the glass plate, and particularly a borosilicate glass is preferred because it is easy to process and capable of suppressing generation of defect, foreign matter, or the like on an optical surface.

The NIR filter 10A may be used by directly adhering its transparent substrate 12 side to, for example, a solid-state image sensing device of an imaging device. In this case, the difference between the linear expansion coefficient of the transparent substrate 12 and the linear expansion coefficient of the adhered part being $30 \times 10^{-7}$/K or less is preferred from the viewpoint of suppressing peeling after being adhered, or the like. For example, when the material of an adhered part is silicon, a material whose linear expansion coefficient is in the vicinity of $30 \times 10^{-7}$ to $40 \times 10^{-7}$/K, for example, glass of AF33 and Tempax made by SCHOTT AG; SW-3, SW-Y, SW-YY, AN100 and EN-A1 made by Asahi Glass Company, Limited; or the like (all of them are product names) is preferred as the material of the transparent substrate 12. When the material of the adhered part is ceramic such as alumina, a material whose linear expansion coefficient is in the vicinity of $50 \times 10_{-7}$ to $80 \times 10_{-7}$/K, for example, glass of D263 and B270 made by SCHOTT AG; FP1 and FP01eco made by Asahi Glass Company, Limited; or the like (all of them are product names) is preferred as a material of the transparent substrate 12.

Examples of the selected wavelength shielding layers 13 formed on both main surfaces of the near-infrared absorbing layer 11 in the NIR filter 10B having a structure illustrated in FIG. 1B include a dielectric multilayer film, a layer which absorbs or reflects light of a particular wavelength containing at least one selected from a near-infrared and infrared absorbent, a color tone correcting dye and an ultraviolet absorbent, and the like.

In the NIR filter 10B and the NIR filter 10C, the two selected wavelength shielding layers 13 in combination may either be the same or different. When the two selected wavelength shielding layers 13 are structured as a first selected wavelength shielding layer 13a and a second selected wavelength shielding layer 13b which differ in optical characteristics, their selected wavelength shielding characteristics and the order thereof are adjusted appropriately according to the optical device in which it is used. From this viewpoint, as the positional relation of the near-infrared absorbing layer 11, the first selected wavelength shielding layer 13a and the second selected wavelength shielding layer 13b, specifically, there are following positional relations of (1x), (1y), (1z).

(1x) first selected wavelength shielding layer 13a, near-infrared absorbing layer 11, second selected wavelength shielding layer 13b (1y) near-infrared absorbing layer 11, first selected wavelength shielding layer 13a, second selected wavelength shielding layer 13b (1z) near-infrared absorbing layer 11, second selected wavelength shielding layer 13b, first selected wavelength shielding layer 13a When taking the aspects of above (1y) (1z), preferably, an antireflection layer is provided on the near-infrared absorbing layer because a visible light transmittance loss occurs by reflection on the near-infrared absorbing layer.

Directions when the NIR filter 10B and the NIR filter 10C obtained in this manner are disposed in a device are selected appropriately according to the design.

The dielectric multilayer film is obtained by alternately stacking a dielectric film with a low refractive index and a dielectric film with a high refractive index. Thus, a function to control transmission and shielding of light in a specific wavelength region by utilizing interference of light can be exhibited. However, the low refractive index and the high refractive index mean to have a high refractive index and a low refractive index with respect to the refractive index of an adjacent layer.

The dielectric film with a high refractive index is not particularly limited as long as it has a high refractive index than the dielectric film with a low refractive index. The refractive index of the high refractive index is preferably 1.6 or more. More preferably, it is 2.2 to 2.5. Examples of the material of a dielectric with such a refractive index include a $Ta_2O_5$ (refractive index: 2.22), $TiO_2$ (refractive index:

2.41), Nb$_2$O$_5$ (refractive index: 2.3), and the like. Among them, TiO$_2$ or the like is more preferred by generally judging film formability and refractive index, and the like including reproducibility and stability thereof.

On the other hand, the refractive index of the low refractive index is preferably 1.45 or more and less than 1.55, more preferably 1.45 to 1.47. Examples of the material of a dielectric having such a refractive index include an SiO$_2$ (refractive index: 1.46), SiO$_x$N$_y$ (refractive index: 1.46 or more and less than 1.55), and the like. Among them, SiO$_2$ is more preferred from the point of refractive index, reproducibility in film formability, stability, economy, and the like.

Examples of the antireflection layer include a dielectric multilayer film, an intermediate refractive index medium, a moth-eye structure with a gradually varying refractive index, and the like. Among others, it is preferred to use the dielectric multilayer film from the viewpoint of optical efficiency and productivity. The dielectric multilayer film used for the antireflection layer can be obtained by alternately stacking a dielectric film with a low refractive index and a dielectric film with a high refractive index, similarly to the dielectric multilayer film used for the selected wavelength shielding layers 13.

Preferably, the present filter has the selected wavelength shielding layer and the near-infrared absorbing layer and satisfies the following conditions (iv-1) to (iv-3). Preferably, the present filter further has an antireflection layer for satisfying the conditions (iv-1) to (iv-3).

(iv-1) average transmittance is 80% or more in the wavelength region of 420 nm to 620 nm, (iv-2) transmittance is 2% or less in the wavelength region of 710 nm to 1100 nm, (iv-3) a difference is 3 nm or less between a wavelength with 20% transmittance of light incident from a direction orthogonal to a main surface and a wavelength with 20% transmittance of light incident from a direction making an angle of 30 degrees relative to a line orthogonal to the main surface, in the wavelength region of 600 nm to 700 nm.

In the present filter, the visible light transmittance is secured sufficiently by satisfying the condition (iv-1), and moreover, angle dependency which the dielectric multilayer film has is solved, and the light shielding property of the near-infrared region is secured sufficiently in a wide wavelength region without being affected by the influence of the incident angle by satisfying the conditions (iv-2) and (iv-3). Here, in the condition (iv-3), the angle dependency is evaluated by using a shift of wavelength in 20% transmittance when the incident angle is 0 degree and when it is 30 degrees as an index. When this condition is satisfied, it can be said that a wavelength shift in other incident angles does not become a problem as the present filter.

Figure 6:
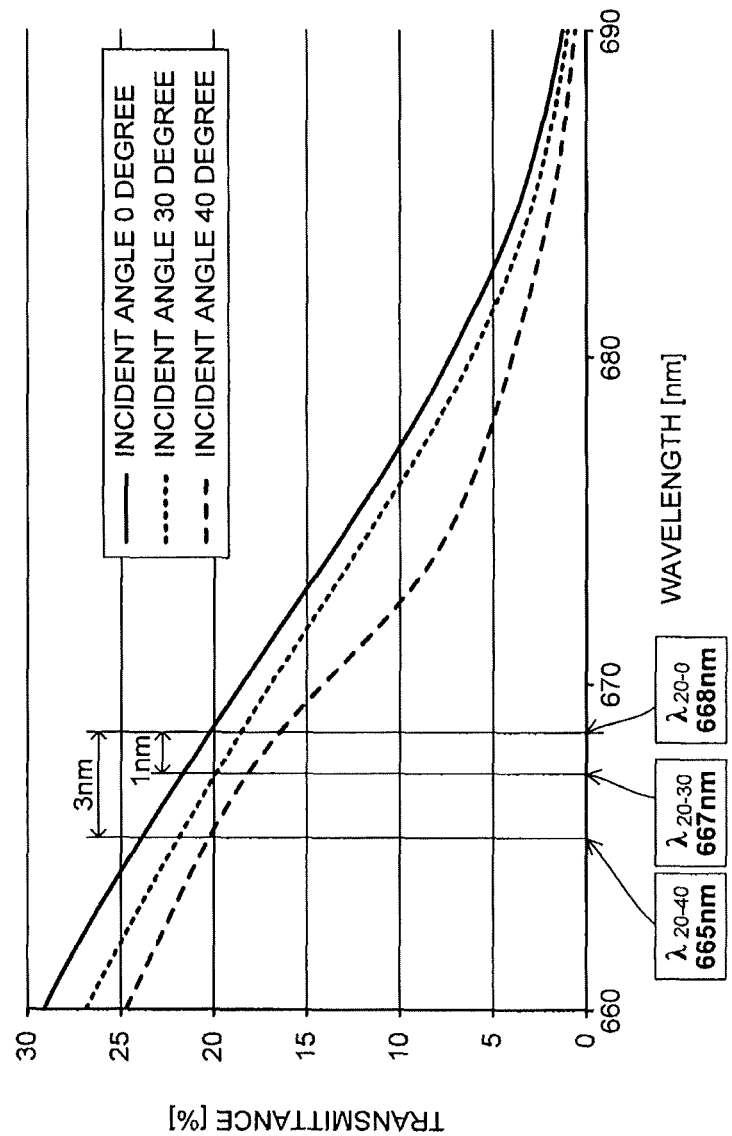
FIG. 6 is a chart illustrating in enlargement near-infrared wavelength regions in transmission spectra with an incident angle of 0 degree, 30 degrees and 40 degrees of a near-infrared cut filter of an example of the present invention.

The condition of wavelength shift of above (iv-3) will be described specifically with FIG. 6. Indicated by a solid line, a dotted line and a dashed line in FIG. 6 are a transmission spectrum (solid line) of light with a 0-degree incident angle and respective transmission spectra of light with a 30-degree incident angle (dotted line) and light with a 40-degree incident angle (dashed line) in the wavelength region of 660 nm to 690 nm in the NIR filter (NIR filter in which there are stacked antireflection layer (dielectric multilayer film)/near-infrared absorbing layer/glass plate/selected wavelength shielding layer (dielectric multilayer film) in this order) obtained in Example 110 as an example of the present invention in Example which will be described later. Here, as illustrated in FIG. 6, in the NIR filter obtained in Example 110, the wavelength ($\lambda_{20\text{-}0}$) of 20% transmittance when the incident angle is 0 degree is 668 nm, the wavelength ($\lambda_{20\text{-}30}$) of 20% transmittance when the incident angle is 30 degrees is 667 nm, and the difference therebetween is 1 nm. Likewise, the wavelength ($\lambda_{20\text{-}40}$) of 20% transmittance when the incident angle is 40 degrees is 665 nm, and the difference therebetween is 3 nm.

In spectral characteristics of the NIR filter, performance to rapidly change transmittance in a boundary wavelength region between the transmitted light wavelength and the light shielding wavelength is required. In order to obtain the performance to rapidly change transmittance in a boundary wavelength region between the transmitted light wavelength and the light shielding wavelength, in the dielectric multilayer film, the total stack number of the dielectric film with a low refractive index and the dielectric film with a high refractive index is preferably 15 layers or more, more preferably 25 layers or more, furthermore preferably 30 layers or more. When the total stack number increases, tact during manufacturing becomes long, a warpage of the dielectric multilayer film or the like occurs, and a film thickness of the dielectric multilayer film increases. Thus, it is preferred to be 100 layers or less, more preferably 75 layers or less, furthermore preferably 60 layers or less. In the order of stacks of the low-refractive-index dielectric film and the high-refractive-index dielectric film, the first layer may either be the low-refractive-index dielectric film or the high-refractive-index dielectric film as long as they are alternate.

As the film thickness of the dielectric multilayer film, in addition to satisfying the above preferred layer number, the thinner the more preferred from the viewpoint of thickness reduction of the NIR filter. The film thickness of such a dielectric multilayer film is preferably 2 μm to 10 μm, though depending on the selected wavelength shielding characteristics. Note that when the dielectric multilayer film is used as the antireflection layer, its thickness is preferably 0.1 μm to 1 μm. Further, when the dielectric multilayer film is disposed on both faces of the near-infrared absorbing layer or respective faces of the transparent substrate and the near-infrared absorbing layer formed on the transparent substrate, a warpage may occur by stress of the dielectric multilayer film. The difference in film thickness of the dielectric multilayer films formed on the respective surfaces in order to suppress occurrence of this warpage is preferably as small as possible after they are formed to have desired selected wavelength shielding characteristics.

In order to form the dielectric multilayer film, for example, a CVD method; a vacuum film formation process such as a sputtering method and a vacuum deposition; a wet film formation process such as a spray method and a dip method; or the like may be used.

As a layer absorbing light of a particular wavelength which is used as the selected wavelength shielding layer 13 and contains at least one selected from a near-infrared and infrared absorber, a color tone correcting dye and an ultraviolet absorbent, for example, there is a light absorbing layer in which respective absorbents are dispersed in a transparent resin by a conventionally known method. Examples of the transparent resin include thermoplastic resins such as polyester resin, acrylic resin, polyolefin resin, polycarbonate resin, polyamide resin, alkyd resin, and the like, resins cured by heat or light such as ene-thiol resin, epoxy resin, thermosetting acrylic resin, light-curing acrylic resin, silsesquioxane resin, and the like. The contents of respective absorbents in these light absorbing layers are adjusted appropriately within a range not impairing effects of the present invention according to light absorbing performance of the respective absorbents.

The present filter can be used as an NIR filter of an imaging device such as a digital still camera, a digital video camera, a monitoring camera, an on-vehicle camera, or a web camera, an automatic exposure meter, or the like, an NIR filter for PDP, or the like. The present filter is used preferably in the above imaging device and is disposed between, for example, an imaging lens and a solid-state image sensing device.

Further the present filter can be used by directly adhering onto a solid-state image sensing device of an imaging device, a light-receiving element of an automatic exposure meter, an imaging lens, a PDP, or the like via an adhesive layer. Moreover, it can be used by directly adhering onto a glass window or a lamp of a vehicle (automobile or the like) similarly via an adhesive layer.

EXAMPLE

Hereinafter, the present invention will be described more specifically by examples. The present invention is not limited in any way to the embodiments and examples which will be described below. Examples 1 to 75 and Example 110 are examples of the present invention, and Examples 76 to 109 are comparative examples.

<Synthesis of Dye>

Dyes used in respective examples were synthesized by the following method. Dyes (A 11-1) to (A11-19) are included in the dye (A11) and are used in the examples of the present invention. On the other hand, dyes (A11-20) to (A11-27) have the same structure as the formula (A11) except $R^4$ in the formula (A11) and are dyes used in the comparative example of the present invention.

(1) Synthesis of Near-Infrared Absorbing Dyes (A11-1) to (A11-27)

Dyes (A11-1) to (A11-27) of components presented in Table 2 below were synthesized. Note that in Table 2, the number of m, $R^{13}$ and the number of carbon atoms of the group (4) expressed by the formula (4) are described for $R^4$. $R^{13-1}$ to $R^{13-3}$ are for distinguishing one to three $R^{13}$ bonded to the carbon atom at an α-position bonded to a carbonyl group, and there is no distinction of position. In Table 2, "-" means a hydrogen atom. In Table 2, "n-" represents a straight chain and Ph represents a benzene ring. i-$C_3H_7$ represents a 1-methylethyl group. Specific structures of $R^4$ in Table 2 correspond to the above formulas (1a), (1b), (2a) to (2e), (3a) to (3e). Corresponding formula numbers are also provided in Table 2. Note that in the dyes (A11-1) to (A11-27), two $R^1$ in total existing one each on the left and right sides are the same on the left and right sides, and the same applies to $R^2$ to $R^4$.

TABLE 2

| | Dye reference | $R^1$ | Formula | m | $R^{13-1}$ | $R^{13-2}$ | $R^{13-3}$ | Number of C atoms |
|---|---|---|---|---|---|---|---|---|
| Dye for example | A11-1 | $CH_3$ | 2b | 2 | n-$C_3H_7$ | n-$C_3H_7$ | — | 7 |
| | A11-2 | $CH_3$ | 2c | 2 | n-$C_2H_5$ | n-$C_4H_9$ | — | 7 |
| | A11-3 | $CH_3$ | 2d | 2 | n-$C_7H_{15}$ | n-$C_9H_{19}$ | — | 17 |
| | A11-4 | $CH_3$ | 2e | 2 | —$(CH_2)_2CH(CH_3)CH_2C(CH_3)_3$ | —$CH(CH_3)CH_2C(CH_3)_3$ | — | 17 |
| | A11-5 | $C_2H_5$ | 2c | 2 | n-$C_2H_5$ | n-$C_4H_9$ | — | 7 |
| | A11-6 | n-$C_3H_7$ | 2c | 2 | n-$C_2H_5$ | n-$C_4H_9$ | — | 7 |
| | A11-7 | i-$C_3H_7$ | 2c | 2 | n-$C_2H_5$ | n-$C_4H_9$ | — | 7 |
| | A11-8 | $C_2H_5$ | 3b | 3 | $CH_3$ | —$(CH_2)_3$—O—Ph$(CH_3)_2$ | $CH_3$ | 14 |
| | A11-9 | $CH_3$ | 1b | 1 | —$CH_2CH(CH_3)_2$ | — | — | 5 |
| | A11-10 | $CH_3$ | 2a | 2 | $CH_3$ | n-$C_3H_7$ | — | 5 |
| | A11-11 | $CH_3$ | 1a | 1 | —$CH(CH_3)CH_2C(CH_3)_3$ | — | — | 8 |
| | A11-12 | $CH_3$ | 3a | 3 | $CH_3$ | n-$C_2H_5$ | $CH_3$ | 5 |
| | A11-13 | $CH_3$ | 3b | 3 | $CH_3$ | —$(CH_2)_3$—O—Ph$(CH_3)_2$ | $CH_3$ | 14 |
| | A11-14 | $CH_3$ | 3c | 3 | n-$C_3H_7$ | $CH_3$ | $CH_3$ | 6 |
| | A11-15 | —$C(CH_3)_2$—$C_2H_5$ | 2c | 2 | n-$C_2H_5$ | n-$C_4H_9$ | — | 7 |
| | A11-16 | —$C(CH_3)_2$—$C_2H_5$ | 3b | 3 | $CH_3$ | —$(CH_2)_3$—O—Ph$(CH_3)_2$ | $CH_3$ | 14 |
| | A11-17 | —$C(CH_3)_2$—$C_2H_5$ | 3c | 3 | n-$C_3H_7$ | $CH_3$ | $CH_3$ | 6 |
| | A11-18 | —$C(CH_3)_2$—$C_2H_5$ | 3d | 3 | n-$C_4H_9$ | $CH_3$ | $CH_3$ | 7 |
| | A11-19 | —$C(CH_3)_2$—$C_2H_5$ | 3e | 3 | n-$C_6H_{13}$ | $CH_3$ | $CH_3$ | 9 |
| Dye for comparative example | A11-20 | $CH_3$ | — | 1 | — | — | — | 1 |
| | A11-21 | $CH_3$ | — | 1 | $C_2H_5$ | — | — | 3 |
| | A11-22 | $CH_3$ | — | 1 | n-$C_4H_9$ | — | — | 5 |
| | A11-23 | $CH_3$ | — | 1 | n-$C_5H_{11}$ | — | — | 6 |
| | A11-24 | $CH_3$ | — | 1 | n-$C_6H_{13}$ | — | — | 7 |
| | A11-25 | $CH_3$ | — | 1 | n-$C_{10}H_{21}$ | — | — | 11 |
| | A11-26 | $CH_3$ | — | 2 | $CH_3$ | $CH_3$ | — | 3 |
| | A11-27 | $CH_3$ | — | 2 | $CH_3$ | $C_2H_5$ | — | 4 |

Dyes (A11-1) to (A11-27) were synthesized according to the above formula (F1). Note that in the formula (F1), the dyes (A11-1) to (A11-27) are represented by dye A(11). In production of the dyes (A11-1) to (A11-27), $R^2$ and $R^3$ in the formula (F1) are hydrogen atoms. Further, $R^1$ and $R^4$ represent groups in the above Table 2.

[Production of Dye (A11-1)]

A production example of the dye (A11-1) will be described specifically below by using the reaction formula (F1). Note that in the description below, although $R^1$ to $R^4$ in a material component (g) and intermediate products ((b) to (h)) are not described, $R^1$ is a methyl group, $R^2$ and $R^3$ are hydrogen atoms, and $R^4$ is a group (2b).

In the production of the dye (A11-1), a compound (c) made by Tokyo Chemical Industry Co., Ltd. was used as a starting material because the compound (c) in the reaction formula (F1) (where $R^1$ is a methyl group, $R^2$ and $R^3$ are hydrogen atoms) is available as a commercial product.

(Production of Compound (d))

To a 500 ml eggplant flask, the compound (c) (25 g, 0.14 mol) and methanol 360 ml were added, and sodium borohydride (9.0 g, 0.22 mol) was added slowly at 0° C. After addition, stirring was performed for three hours at room temperature. After reaction was finished, water was added slowly, and thereafter, liquid separation was performed with a sodium hydrogen carbonate aqueous solution and ethyl acetate. After the liquid separation, an obtained organic layer was dried with magnesium sulfate, the solvent was distilled off using a rotary evaporator, and purification was performed by silica gel column chromatography. A developing solvent was ethyl acetate:hexane=1:4. As a result, a compound (d) (23 g, 0.13 mol, 91% yield) was obtained.

(Production of Compound (e))

To a 2 L eggplant flask, the compound (d) (20 g, 0.11 mol) and concentrated sulfuric acid (80 g, 0.81 mol) were added, and it was cooled to 0° C. Thereafter, a mixed solution 55 g of concentrated nitric acid:concentrated sulfuric acid=1:5 by weight ratio was dropped slowly. After dropping was finished, the reaction temperature was returned gradually to room temperature, and stirring was performed at the same temperature for 16 hours. After reaction was finished, it was cooled again to 0° C., and a sodium hydroxide aqueous solution was added slowly until PH becomes 9. Precipitate was filtered and washed sufficiently with water and methanol. After washing, an obtained solid matter was refined by silica gel column chromatography. The developing solvent was dichloromethane:hexane=1:5. As a result, a chemical compound (e) (17 g, 0.077 mol, 67% yield) was obtained.

(Production of Compound (f))

Under a nitrogen atmosphere, to a 500 ml eggplant flask, the compound (e) (15 g, 0.068 mol), methanol 150 ml, tetrahydrofuran 150 ml, ammonium formate (23.5 g, 0.37 mol), 10 wt % palladium carbon (12 g) were added, and thereafter the reaction system was opened and stirring was performed under an air atmosphere at room temperature for 12 hours. After reaction was finished, celite filtration of the mixture was performed, obtained filtered liquid was concentrated using a rotary evaporator, and thereafter, purification was performed by silica gel column chromatography (the developing solvent was hexane:ethyl acetate=1:4). As a result, a compound (f) (9.7 g, 0.051 mol, 75% yield) was obtained.

(Production of Compound (h) (Intermediate Used for (A11-1))

Under a nitrogen atmosphere, to a 300 ml eggplant flask, the chemical compound (f) 2.0 g (0.011 mol), dichloromethane 50 ml, triethylamine 2.12 g, (0.021 mol), and a amount of dimethylaminopyridine were added, the reactor was cooled to 0° C., 2-propylvaleryl chloride (g) 2.55 g (0.016 mol) was added as a carboxylic acid chloride having a substituent $R^4$, and thereafter, stirring was performed under the nitrogen atmosphere at the same temperature for 30 minutes. After reaction was finished, a saturated saline solution 50 ml was added to the mixture, and extraction was performed with dichloromethane 100 ml. An obtained organic layer was dried with anhydrous sodium sulfate, the solvent was distilled off using a rotary evaporator, and thereafter purification was performed by silica gel column chromatography (the developing solvent was hexane:ethyl acetate=4:1). As a result, a compound (h) ($R^4$=CH(n-$C_3H_7$)(n-$C_3H_7$)) was obtained (2.5 g, 0.0079 mol, 70% yield).

(Production of Dye (A11-1))

A Dean-Stark pipe was attached to a 500 ml eggplant flask, the compound (h) (2.0 g, 0.0063 mol) which is an intermediate used for A11-1, benzene 140 ml, 1-butanol 60 ml, and squaric acid 0.36 g (0.032 mol) were added thereto, and stirring for three hours was performed under an azeotrope heating reflux condition. After reaction was finished, the reaction solvent was distilled off using a rotary evaporator, and thereafter purification was performed by silica gel column chromatography. The developing solvent was hexane ethyl acetate=7:3. As a result, a dye (A11-1) (2.9 g, 0.0041 mol, 65% yield) was obtained.

[Production of Dyes (A11-2) to (A11-4) and (A11-9) to (A11-14)]

Dyes (A11-2) to (A11-4) and (A11-9) to (A11-14) were produced similarly except that each $R^4$ of the carboxylic acid chloride (g) having the substituent $R^4$ is $R^4$ presented in Table 2 in the production of the dye (A11-1).

[Production of Dye (A11-5) to (A11-8)]

(Production of Compound (c) (Intermediate Used for (A11-5) to (A11-8))

In production of the dyes (A11-5) to (A11-8), first, a compound (c) (where $R^1$ is $C_2H_5$, n-$C_3H_7$ or i-$C_3H_7$; $R^2$ and $R^3$ are hydrogen atoms) was produced as follows via a compound (b) from a compound (a) (where $R^2$ and $R^3$ are hydrogen atoms) in the reaction formula (F1).

To a 500 ml eggplant flask, the compound (a) (25 g, 0.157 mol), an n-iodoethane (98 g, 0.63 mol), ethyl acetate 100 ml were added and made to react while performing reflux for 24 hours. After reaction was finished, a precipitated solid matter was washed sufficiently with ethyl acetate and filtered, thereby obtaining 44.1 g (0.14 mol, 89% yield) of the compound (b) ($R^1$=$C_2H_5$). Similarly, instead of n-iodoethane, n-iodopropane was used to obtain the compound (b) ($R^1$=n-$C_3H_7$), and iodoisopropane was used to obtain the compound (b) ($R^1$=i-$C_3H_7$). When n-iodopropane and iodoisopropane were used, ethyl acetate was not used for the solvent, and reflux was performed only with the compound (b) and n-iodopropane and iodoisopropane.

To a 500 ml eggplant flask, the compound (b) ($R^1$=$C_2H_5$) 27 g (0.086 mol), sodium hydrate 16 g (0.40 mol), water 300 ml were added, and it was stirred for three hours at room temperature. After reaction was finished, dichloromethane was added and an organic layer was extracted, the obtained organic layer was dried with anhydrous sodium sulfate, the solvent was distilled off using a rotary evaporator, and thereafter purification was performed by silica gel column chromatography. As a result, a compound (c) ($R^1$=$C_2H_5$)) 15 g (0.080 mol, 94% yield) was obtained. The compound (c) whose $R^1$ is n-$C_3H_7$ or i-$C_3H_7$ was obtained similarly from the compound (b) ($R^1$=n-$C_3H_7$ or i-$C_3H_7$).

These three compounds (c) were each used as described in Table 2 to produce the dyes (A11-5) to (A11-8) similarly to the case of the dye (A11-1) except that each $R^4$ of the carboxylic acid chloride (g) having a substituent $R^4$ is $R^4$ presented in Table 2.

[Production of Dyes (A11-15) to (A11-19)]

To a 2 L eggplant flask, the compound (a) (49 g, 0.31 mol) was added, and sodium borohydride (12.9 g, 0.34 mol) was added bit by bit at 0° C. After it was added, p-toluenesulfonic acid (58.3 g, 0.34 mol) was added slowly at 0° C. into the reaction system. After being subjected to reaction of one hour, the eggplant flask was cooled again to 0° C., water was dropped bit by bit, and the reaction was finished. Dichloromethane was added thereto and an organic layer was condensed by using an evaporator. The condensed liquid was column-refined with a developing solution of ethyl acetate:hexane=1:6, and a compound (b') (where $R^1$ to $R^3$ are hydrogen atoms) (46 g, 93% yield) having a skeleton similar to the compound (b) in the reaction formula (F1) was obtained.

To a 2 L eggplant flask, the compound (b') (46 g, 0.29 mol), copper chloride (I) (3.07 g, 0.03 mol), 2-chloro-2-methyl-3-butyne (35.0 g, 0.34 mol), and THF 570 ml were added. Triethylamine (34.6 g, 0.34 mol) was dropped slowly at 0° C. After they were made to react at room temperature for four hours, water 500 ml was added to the reaction solution to finish the reaction. The reaction solution was extracted with dichloromethane, and an organic layer was condensed by an evaporator. The condensed liquid was column-refined by hexane:dichloromethane=4:1, and 40 g (62% yield) of a compound (d') ($R^1$=C(CH$_3$)$_2$C$_2$H) having a skeleton similar to the compound (d) in the reaction formula (F1) was obtained.

In a 1 L eggplant flask, the compound (d') (where $R^1$ is C(CH$_3$)$_2$C$_2$H; $R^2$ and $R^3$ are hydrogen atoms) 36 g (0.16 mol) and THF 300 ml were put. Then, Pd/C 4 g was added at 0° C. to the eggplant flask. After Pd/C was added, ethanol 300 ml was added at 0° C. Thereafter, the reactor was subjected to deaeration and nitrogen addition twice repeatedly, and hydrogen was added after deaeration. Reaction was performed for eight hours in a hydrogen atmosphere at normal pressure. After reaction was finished, Pd/C was removed by filtration, and filtered liquid was condensed by an evaporator. The condensed liquid was column-refined with developing solvent hexane, and the compound (d) (where $R^1$ is C(CH$_3$)$_2$C$_2$H$_5$; $R^2$ and $R^3$ are hydrogen atoms) was obtained.

The obtained compound (d) was used to produce dyes (A11-15) to (A11-19) similarly to the case of the dye (A11-1) except that each $R^4$ of the carboxylic acid chloride (g) having a substituent $R^4$ is $R^4$ presented in Table 2.

[Production of Dye (A11-20) to (A11-27)]

Dyes (A11-20) to (A11-27) were synthesized, in which, in the formula (A11) in the formula (F1), $R^1$ is a methyl group, $R^2$ and $R^3$ are hydrogen atoms, and $R^4$ is out of the range of the dye (A11) as described in Table 2. Specifically, dyes (A11-20) to (A11-27) were produced similarly except that each $R^4$ of the carboxylic acid chloride (g) having the substituent $R^4$ is $R^4$ presented in Table 2 in the production of the dye (A11-1).

(2) Solubility

Regarding the dyes (A11-1) to (A11-10) and (A11-20) to (A11-27) obtained above, solubility to organic solvent was evaluated as follows.

Three kinds of solvents, cyclohexanone, methyl isobutyl ketone (MIBK), toluene, were used as the organic solvent in the solubility test. Results are presented in Table 3. Note that in Table 3, % is mass % of the dye to the mass of the entire solution. Further, the temperature of each organic solvent in the solubility test was 50° C.

TABLE 3

| | Dye reference | Solubility to organic solvent (mass %) | | |
| --- | --- | --- | --- | --- |
| | | Cyclohexanone | MIBK | Toluene |
| Dye for example | A11-1 | 10%< | 2.50% | 10%< |
| | A11-2 | 10%< | 10%< | 5.00% |
| | A11-3 | 10%< | 10%< | 10%< |
| | A11-4 | 10%< | 10%< | 10%< |
| | A11-5 | 10%< | 10%< | 10%< |
| | A11-6 | 10%< | 10%< | 10%< |
| | A11-7 | 10%< | 3.00% | 10%< |
| | A11-8 | 10%< | 10%< | 10%< |
| | A11-9 | 3.00% | <1.0% | 2.50% |
| | A11-10 | 10%< | 1.00% | 3.00% |
| Dye for comparative example | A11-20 | <1.0% | <1.0% | <1.0% |
| | A11-21 | <1.0% | <1.0% | <1.0% |
| | A11-22 | <1.0% | <1.0% | 1.00% |
| | A11-23 | 2.50% | <1.0% | 2.50% |
| | A11-24 | 5.00% | 1.00% | 5.00% |
| | A11-25 | 3.00% | 1.00% | 10%< |
| | A11-26 | <1.0% | <1.0% | <1.0% |
| | A11-27 | 1.00% | <1.0% | 1.00% |

The dyes (A11-1) to (A11-8) and the dye (A11-10) have high solubility to cyclohexane. The dyes (A11-2) to (A11-6) and the dye (A11-8) have high solubility to MIBK. The dyes (A11-1), (A11-3) to (A11-8) have high solubility to toluene. Therefore, it can be said that the dyes (A11-1) to (A11-10) have high solubility to organic solvent.

The dyes for comparative examples (A11-20) to (A11-27) generally have low solubility to organic solvent as compared to the dyes for examples.

[Production of Cut Filter]

In example 1 to example 109 below, the near-infrared absorbing layer 11 containing the dyes (A11-1) to (A11-27) obtained above and the transparent resin (B) with a refractive index of 1.45 or more were formed on the transparent substrate 12, so as to produce NIR filters having the structure illustrated in FIG. 1A. Note that as the transparent substrate 12, a glass plate (soda glass) with a thickness of 0.3 mm was used.

Example 1 to Example 75

As described in Table 4, one of the dyes (A 11-1) to (A11-19) and a 15 mass % cyclohexanone solution of the polyester resin were mixed, and stirred and solved at room temperature to obtain a coating liquid. In any case, the dyes (A11-1) to (A11-19) were mixed by a content which causes ($\lambda_b$–$\lambda_a$) (absorption width when the transmittance is 1% or less) defined in the above condition (ii-2) to be 30 nm with a film thickness of 3 μm or less to 100 parts by mass of the polyester resin. As the polyester resin, B-OKP2 (product name, made by Osaka Gas Chemicals Co., Ltd., refractive index 1.64) was used.

The coating liquid obtained above was applied on a glass plate by a spin coat method and dried at 90° C. for five minutes, and thereafter an obtained sample was further dried at 150° C. for 60 minutes, thereby obtaining NIR filters of Example 1 to Example 17. The film thicknesses of the near-infrared absorbing layers of the obtained NIR filters 1 to 17 were all 2.7 μm.

NIR filters 18 to 25 of Example 18 to Example 25 were obtained similarly to Examples 1 to 17 except that dyes described in Table 4 and a polyester resin (made by TOYOBO CO., LTD., product name: VYLON 103, refractive index 1.55) as the transparent resin (B) were used in the above. The film thicknesses of the near-infrared absorbing layers of the obtained NIR filters 18 to 25 were all 2.7 μm.

Moreover, NIR filters 26 to 33 of Example 26 to Example 33 were obtained similarly to Examples 1 to 17 except that dyes described in Table 5 and a polyisobutyl methacrylate (made by Tokyo Chemical Industry Co., Ltd., refractive index 1.48) as the transparent resin (B) were used, and the film thicknesses of the near-infrared absorbing layers were 31.5 μm.

NIR filters 34 to 39 of Example 34 to Example 39 were obtained similarly to Examples 1 to 17 except that dyes described in Table 5 were used and a polycarbonate (made by Teijin Chemicals Ltd., product name: TS2020, refractive index 1.59) was used as the transparent resin (B), and the film thicknesses of the near-infrared absorbing layers were 0.6 μm.

NIR filters 40 to 45 of Example 40 to Example 45 were obtained similarly to Examples 1 to 17 except that dyes described in Table 5 were used and a cyclic olefin polymer (made by JSR Corporation, product name: ARTON, refractive index 1.51) was used as the transparent resin (B), and the film thicknesses of the near-infrared absorbing layers were 1.7 μm.

NIR filters 46 to 51 of Example 46 to Example 51 were obtained similarly to Examples 1 to 17 except that dyes described in Table 5 were used and a polycarbonate (made by Teijin Chemicals Ltd., product name: SP1516, refractive index 1.60) was used as the transparent resin (B), and the film thicknesses of the near-infrared absorbing layers were 0.9 μm.

NIR filters 52 to 57 of Example 52 to Example 57 were obtained similarly to Examples 1 to 17 except that dyes described in Table 6 were used and a polycarbonate (made by MITSUBISHI GAS CHEMICAL COMPANY, INC., product name: EP5000, refractive index 1.63) was used as the transparent resin (B), and the film thicknesses of the near-infrared absorbing layers were 2.4 μm.

NIR filters 58 to 63 of Example 58 to Example 63 were obtained similarly to Examples 1 to 17 except that dyes described in Table 6 were used and a polycarbonate (made by Teijin Chemicals Ltd., product name: SP3810, refractive index 1.63) was used as the transparent resin (B), and the film thicknesses of the near-infrared absorbing layers were 2.8 μm.

NIR filters 64 to 69 of Example 64 to Example 69 were obtained similarly to Examples 1 to 17 except that dyes described in Table 6 were used and a polycarbonate (made by Teijin Chemicals Ltd., product name: SP3810, refractive index 1.63) was used as the transparent resin (B), and the film thicknesses of the near-infrared absorbing layers were 1.0 μm.

NIR filters 70 to 75 of Example 70 to Example 75 were obtained similarly to Examples 1 to 17 except that dyes described in Table 6 were used and an acrylic resin (made by Mitsubishi Rayon Co., Ltd., product name: BR50, refractive index 1.56) was used as the transparent resin (B), and the film thicknesses of the near-infrared absorbing layers were 2.3 μm.

Example 76 to Example 109

As described in Table 7 and Table 8, one of the dyes (A11-20) to (A11-27) and the transparent resin (B) were used to obtain NIR filters 76 to 109 of Example 76 to Example 109. The film thicknesses of the near-infrared absorbing layers of the respective NIR filters are the same film thicknesses as those of respective examples of the examples that use the same transparent resin (B).

<Evaluation of NIR Filter>

(1) Absorption Characteristics

Regarding transmittance (%/nm) of the NIR filters 1 to 109 obtained above, transmission spectra were measured and calculated by using an ultraviolet visible light spectrophotometer (U-4100 type spectrophotometer made by Hitachi High-Technologies Corporation). Analysis results of transmission spectra of the near-infrared absorbing layers which the NIR filters have are presented in Table 4, Table 5 and Table 6 for the NIR filters 1 to 25, 26 to 51, 52 to 75, respectively, and are presented in Table 7 and Table 8 for the NIR filters 76 to 94, 95 to 109, respectively. In Table 4 to Table 8, the ratios (parts by mass) of dyes to 100 parts by mass of the transparent resin (B) and film thicknesses of the near-infrared absorbing layers are described together.

Further, conditions of preferred transmission spectra of the near-infrared absorbing layers in the present filter and $I_s$ values obtained by the formula: $n_d(B) \times (\lambda_a - \lambda_c)$ described in above (ii-3) are described in Table 4 to Table 8 together with $\lambda_a$ in the condition (ii-1) and $\lambda_b - \lambda_a$ in the condition (ii-2). Note that values described in Table 4 to Table 8 are values obtained by subtracting transmittance of a glass plate from transmittance of an NIR filter. Specifically, they are values obtained by calculating reflection on a near-infrared absorbing layer-air interface by subtracting the influences of absorption of a glass plate and reflection on a glass plate-near-infrared absorbing layer interface and a glass plate-air interface.

TABLE 4

| Example | NIR filter No. | Kind of Transparent resin (B): $n_d(B)$ | Dye No. | Ratio of dye to 100 parts by mass of resin [parts by mass] | Film thickness [μm] | $\lambda_{max}$ [nm] | 430 nm to 600 nm Average transmittance [%] | $\lambda_a$ [nm] | $\lambda_b$ [nm] | $\lambda_b - \lambda_a$ [nm] | $\lambda_c$ [nm] | $\lambda_a - \lambda_c$ [nm] | $I_s$ value |
|---|---|---|---|---|---|---|---|---|---|---|---|---|---|
| 1 | 1 | B-OKP2 | A11-1 | 3.0 | 2.7 | 711 | 94.6 | 695 | 725 | 30 | 625 | 70 | 114.8 |
| 2 | 2 | $n_d(B)$: 1.64 | A11-2 | 2.7 | | 711 | 93.6 | 694 | 724 | 30 | 625 | 69 | 113.2 |
| 3 | 3 | | A11-3 | 4.0 | | 710 | 94.2 | 694 | 724 | 30 | 625 | 69 | 113.2 |
| 4 | 4 | | A11-4 | 4.0 | | 710 | 93.8 | 693 | 723 | 30 | 625 | 68 | 111.5 |
| 5 | 5 | | A11-5 | 2.7 | | 713 | 95.5 | 697 | 727 | 30 | 631 | 66 | 108.2 |
| 6 | 6 | | A11-6 | 2.7 | | 714 | 95.7 | 698 | 728 | 30 | 633 | 65 | 106.6 |
| 7 | 7 | | A11-7 | 2.7 | | 715 | 95.7 | 700 | 730 | 30 | 636 | 64 | 105.0 |
| 8 | 8 | | A11-8 | 3.6 | | 706 | 95.1 | 691 | 721 | 30 | 626 | 65 | 106.6 |
| 9 | 9 | | A11-9 | 2.7 | | 710 | 94.5 | 694 | 724 | 30 | 624 | 70 | 114.8 |
| 10 | 10 | | A11-10 | 2.7 | | 705 | 93.9 | 689 | 719 | 30 | 620 | 69 | 113.2 |
| 11 | 11 | | A11-11 | 2.7 | | 710 | 95.1 | 693 | 723 | 30 | 623 | 70 | 114.8 |
| 12 | 12 | | A11-12 | 2.5 | | 705 | 95.8 | 689 | 719 | 30 | 620 | 69 | 113.2 |
| 13 | 13 | | A11-15 | 3.0 | | 722 | 97.3 | 706 | 736 | 30 | 645 | 61 | 100.0 |

TABLE 4-continued

| Example | NIR filter No. | Kind of Transparent resin (B): $n_d(B)$ | Dye No. | Ratio of dye to 100 parts by mass of resin [parts by mass] | Film thickness [μm] | $\lambda_{max}$ [nm] | 430 nm to 600 nm Average transmittance [%] | $\lambda_a$ [nm] | $\lambda_b$ [nm] | $\lambda_b - \lambda_a$ [nm] | $\lambda_c$ [nm] | $\lambda_a - \lambda_c$ [nm] | $I_s$ value |
|---|---|---|---|---|---|---|---|---|---|---|---|---|---|
| 14 | 14 | | A11-16 | 3.6 | | 719 | 95.9 | 701 | 731 | 30 | 641 | 60 | 98.4 |
| 15 | 15 | | A11-17 | 2.9 | | 719 | 96.8 | 702 | 732 | 30 | 641 | 61 | 100.0 |
| 16 | 16 | | A11-18 | 3.0 | | 717 | 96.3 | 702 | 732 | 30 | 641 | 61 | 100.0 |
| 17 | 17 | | A11-19 | 3.2 | | 708 | 96.5 | 702 | 732 | 30 | 641 | 61 | 100.0 |
| 18 | 18 | VYLON | A11-1 | 2.7 | 2.7 | 708 | 93.7 | 691 | 721 | 30 | 619 | 72 | 111.6 |
| 19 | 19 | 103 | A11-2 | 2.7 | | 708 | 93.6 | 691 | 721 | 30 | 619 | 72 | 111.6 |
| 20 | 20 | $n_d(B)$: 1.55 | A11-4 | 3.6 | | 707 | 93.7 | 690 | 720 | 30 | 618 | 72 | 111.6 |
| 21 | 21 | | A11-7 | 2.7 | | 713 | 95.2 | 697 | 727 | 30 | 632 | 65 | 100.8 |
| 22 | 22 | | A11-8 | 3.6 | | 704 | 94.2 | 688 | 718 | 30 | 621 | 67 | 103.9 |
| 23 | 23 | | A11-9 | 2.7 | | 706 | 93.6 | 690 | 720 | 30 | 617 | 73 | 113.2 |
| 24 | 24 | | A11-10 | 2.5 | | 702 | 93.1 | 685 | 715 | 30 | 614 | 71 | 110.1 |
| 25 | 25 | | A11-12 | 2.5 | | 698 | 95.6 | 685 | 715 | 30 | 615 | 70 | 108.5 |

TABLE 5

| Example | NIR filter No. | Kind of Transparent resin (B): $n_d(B)$ | Dye No. | Ratio of dye to 100 parts by mass of resin [parts by mass] | Film thickness [μm] | $\lambda_{max}$ [nm] | 430 nm to 600 nm Average transmittance [%] | $\lambda_a$ [nm] | $\lambda_b$ [nm] | $\lambda_b - \lambda_a$ [nm] | $\lambda_c$ [nm] | $\lambda_a - \lambda_c$ [nm] | $I_s$ value |
|---|---|---|---|---|---|---|---|---|---|---|---|---|---|
| 26 | 26 | Poly | A11-1 | 1.9 | 31.5 | 699 | 93.6 | 682 | 712 | 30 | 612 | 70 | 103.6 |
| 27 | 27 | isobutyl | A11-2 | 1.9 | | 697 | 93.8 | 682 | 712 | 30 | 612 | 70 | 103.6 |
| 28 | 28 | methacrylate | A11-4 | 2.5 | | 698 | 93.5 | 682 | 712 | 30 | 613 | 69 | 102.1 |
| 29 | 29 | $n_d(B)$: 1.48 | A11-7 | 1.9 | | 703 | 95.7 | 689 | 719 | 30 | 626 | 63 | 93.2 |
| 30 | 30 | | A11-8 | 2.5 | | 695 | 94.3 | 679 | 709 | 30 | 615 | 64 | 94.7 |
| 31 | 31 | | A11-9 | 1.8 | | 697 | 93.2 | 681 | 711 | 30 | 608 | 73 | 108.0 |
| 32 | 32 | | A11-10 | 1.8 | | 691 | 93.1 | 676 | 706 | 30 | 607 | 69 | 102.1 |
| 33 | 33 | | A11-12 | 1.8 | | 692 | 95.0 | 676 | 706 | 30 | 607 | 69 | 102.1 |
| 34 | 34 | Poly | A11-1 | 13.8 | 0.6 | 710 | 96 | 694 | 724 | 30 | 622 | 72 | 114.3 |
| 35 | 35 | carbonate | A11-2 | 13.8 | | 710 | 96.1 | 694 | 724 | 30 | 622 | 72 | 114.3 |
| 36 | 36 | TS2020 | A11-4 | 19.2 | | 709 | 95.7 | 692 | 722 | 30 | 621 | 71 | 112.7 |
| 37 | 37 | $n_d(B)$: 1.59 | A11-7 | 14.9 | | 716 | 96.6 | 700 | 730 | 30 | 632 | 68 | 108.0 |
| 38 | 38 | | A11-13 | 17.9 | | 705 | 95.6 | 688 | 718 | 30 | 617 | 71 | 112.7 |
| 39 | 39 | | A11-14 | 13.3 | | 705 | 95.5 | 688 | 718 | 30 | 616 | 72 | 114.3 |
| 40 | 40 | Cyclic olefin | A11-1 | 5.2 | 1.7 | 701 | 95.5 | 684 | 714 | 30 | 619 | 65 | 98.3 |
| 41 | 41 | ARTON | A11-2 | 5.2 | | 701 | 95.7 | 684 | 714 | 30 | 618 | 66 | 99.8 |
| 42 | 42 | $n_d(B)$: 1.51 | A11-4 | 7.2 | | 700 | 95.6 | 683 | 713 | 30 | 619 | 64 | 96.7 |
| 43 | 43 | | A11-7 | 5.6 | | 707 | 96.3 | 690 | 720 | 30 | 629 | 61 | 92.2 |
| 44 | 44 | | A11-13 | 5.0 | | 695 | 95.4 | 679 | 709 | 30 | 615 | 64 | 96.7 |
| 45 | 45 | | A11-14 | 6.7 | | 695 | 95.3 | 679 | 709 | 30 | 614 | 65 | 98.3 |
| 46 | 46 | Poly | A11-1 | 9.6 | 0.9 | 708 | 96.4 | 692 | 722 | 30 | 623 | 69 | 110.4 |
| 47 | 47 | carbonate | A11-2 | 9.6 | | 707 | 96.4 | 691 | 721 | 30 | 622 | 69 | 110.4 |
| 48 | 48 | SP1516 | A11-4 | 13.4 | | 707 | 96.3 | 690 | 720 | 30 | 623 | 67 | 107.2 |
| 49 | 49 | $n_d(B)$: 1.60 | A11-7 | 10.3 | | 714 | 97.2 | 698 | 728 | 30 | 634 | 64 | 102.4 |
| 50 | 50 | | A11-13 | 12.4 | | 702 | 96.4 | 686 | 716 | 30 | 619 | 67 | 107.2 |
| 51 | 51 | | A11-14 | 9.2 | | 703 | 96.1 | 686 | 716 | 30 | 618 | 68 | 108.8 |

TABLE 6

| Example | NIR filter No. | Kind of Transparent resin (B): $n_d(B)$ | Dye No. | Ratio of dye to 100 parts by mass of resin [parts by mass] | Film thickness [μm] | $\lambda_{max}$ [nm] | 430 nm to 600 nm Average transmittance [%] | $\lambda_a$ [nm] | $\lambda_b$ [nm] | $\lambda_b - \lambda_a$ [nm] | $\lambda_c$ [nm] | $\lambda_a - \lambda_c$ [nm] | $I_s$ value |
|---|---|---|---|---|---|---|---|---|---|---|---|---|---|
| 52 | 52 | Poly | A11-1 | 3.1 | 2.4 | 711 | 96.5 | 694 | 724 | 30 | 626 | 68 | 111.0 |
| 53 | 53 | carbonate | A11-2 | 3.1 | | 711 | 96.2 | 694 | 724 | 30 | 625 | 69 | 112.6 |
| 54 | 54 | EP5000 | A11-4 | 4.3 | | 709 | 95.7 | 693 | 723 | 30 | 624 | 69 | 112.6 |
| 55 | 55 | $n_d(B)$: 1.63 | A11-7 | 3.3 | | 715 | 96.9 | 700 | 730 | 30 | 636 | 64 | 104.5 |
| 56 | 56 | | A11-13 | 4.0 | | 705 | 96.1 | 689 | 719 | 30 | 621 | 68 | 111.0 |
| 57 | 57 | | A11-14 | 2.9 | | 705 | 95.5 | 689 | 719 | 30 | 620 | 69 | 112.6 |
| 58 | 58 | Poly | A11-1 | 3.0 | 2.8 | 711 | 96 | 695 | 725 | 30 | 626 | 69 | 112.8 |
| 59 | 59 | carbonate | A11-2 | 3.0 | | 710 | 95.5 | 694 | 724 | 30 | 625 | 69 | 112.8 |
| 60 | 60 | SP3810 | A11-4 | 4.1 | | 709 | 95.9 | 693 | 723 | 30 | 625 | 68 | 111.2 |
| 61 | 61 | $n_d(B)$: 1.63 | A11-7 | 3.2 | | 716 | 96.5 | 700 | 730 | 30 | 636 | 64 | 104.6 |
| 62 | 62 | | A11-13 | 3.9 | | 705 | 95.1 | 689 | 719 | 30 | 620 | 69 | 112.8 |
| 63 | 63 | | A11-14 | 2.9 | | 705 | 95.6 | 689 | 719 | 30 | 621 | 68 | 111.2 |
| 64 | 64 | | A11-1 | 3.0 | 1.0 | 706 | 97.3 | 694 | 724 | 30 | 625 | 69 | 112.8 |
| 65 | 65 | | A11-2 | 3.0 | | 706 | 96.1 | 694 | 724 | 30 | 624 | 70 | 114.4 |
| 66 | 66 | | A11-4 | 4.1 | | 705 | 96.8 | 693 | 723 | 30 | 624 | 69 | 112.8 |
| 67 | 67 | | A11-7 | 3.2 | | 712 | 95.8 | 700 | 730 | 30 | 635 | 65 | 106.3 |

TABLE 6-continued

| Example | NIR filter No. | Kind of Transparent resin (B): $n_d$(B) | Dye No. | Ratio of dye to 100 parts by mass of resin [parts by mass] | Film thickness [μm] | $\lambda_{max}$ [nm] | 430 nm to 600 nm Average transmittance [%] | $\lambda_a$ [nm] | $\lambda_b$ [nm] | $\lambda_b - \lambda_a$ [nm] | $\lambda_c$ [nm] | $\lambda_a - \lambda_c$ [nm] | $I_s$ value |
|---|---|---|---|---|---|---|---|---|---|---|---|---|---|
| 68 | 68 | | A11-13 | 3.9 | | 700 | 97.3 | 689 | 719 | 30 | 620 | 69 | 112.8 |
| 69 | 69 | | A11-14 | 2.9 | | 700 | 97.1 | 689 | 719 | 30 | 620 | 69 | 112.8 |
| 70 | 70 | Acrylic resin | A11-1 | 3.7 | 2.3 | 706 | 95.1 | 689 | 719 | 30 | 618 | 71 | 110.9 |
| 71 | 71 | BR50 | A11-2 | 3.7 | | 706 | 95 | 689 | 719 | 30 | 617 | 72 | 112.4 |
| 72 | 72 | $n_d$(B): 1.56 | A11-4 | 5.2 | | 705 | 95 | 688 | 718 | 30 | 617 | 71 | 110.9 |
| 73 | 73 | | A11-7 | 4.0 | | 712 | 96.1 | 695 | 715 | 30 | 630 | 65 | 101.5 |
| 74 | 74 | | A11-13 | 4.8 | | 700 | 94.8 | 683 | 713 | 30 | 612 | 71 | 110.9 |
| 75 | 75 | | A11-14 | 3.6 | | 700 | 94.7 | 684 | 714 | 30 | 613 | 71 | 110.9 |

TABLE 7

| Example | NIR filter No. | Kind of Transparent resin (B): $n_d$(B) | Dye No. | Ratio of dye to 100 parts by mass of resin [parts by mass] | Film thickness [μm] | $\lambda_{max}$ [nm] | 430 nm to 600 nm Average transmittance [%] | $\lambda_a$ [nm] | $\lambda_b$ [nm] | $\lambda_b - \lambda_a$ [nm] | $\lambda_c$ [nm] | $\lambda_a - \lambda_c$ [nm] | $I_s$ value |
|---|---|---|---|---|---|---|---|---|---|---|---|---|---|
| 76 | 76 | B-OKP2 | A11-20 | 2.3 | 2.7 | 711 | 94.4 | 694 | 724 | 30 | 619 | 75 | 123.0 |
| 77 | 77 | $n_d$(B): 1.64 | A11-21 | 2.4 | | 711 | 94.5 | 694 | 724 | 30 | 622 | 72 | 118.1 |
| 78 | 78 | | A11-22 | 2.7 | | 710 | 94.8 | 694 | 724 | 30 | 622 | 72 | 118.1 |
| 79 | 79 | | A11-23 | 2.7 | | 710 | 93.7 | 694 | 724 | 30 | 622 | 72 | 118.1 |
| 80 | 80 | | A11-24 | 2.7 | | 710 | 94.8 | 694 | 724 | 30 | 622 | 72 | 118.1 |
| 81 | 81 | | A11-25 | 3.0 | | 710 | 94.5 | 693 | 723 | 30 | 621 | 72 | 118.1 |
| 82 | 82 | | A11-26 | 2.7 | | 709 | 94.7 | 693 | 723 | 30 | 622 | 71 | 116.4 |
| 83 | 83 | | A11-27 | 2.5 | | 710 | 94.8 | 694 | 724 | 30 | 623 | 71 | 116.4 |
| 84 | 84 | VYLON 103 | A11-20 | precipitation | 2.7 | 706 | 93.2 | 689 | 719 | 30 | 609 | 80 | 124.0 |
| 85 | 85 | $n_d$(B): 1.55 | A11-24 | 2.4 | | 706 | 94.6 | 689 | 719 | 30 | 609 | 80 | 124.0 |
| 86 | 86 | | A11-25 | 3.0 | | 706 | 85.2 | 690 | 720 | 30 | 574 | 116 | 179.8 |
| 87 | 87 | Polyisobutyl | A11-20 | precipitation | 31.5 | 697 | 91.3 | 680 | 710 | 30 | 596 | 84 | 124.3 |
| 88 | 88 | methacrylate | A11-24 | 1.7 | | 706 | 91.8 | 680 | 710 | 30 | 588 | 92 | 136.2 |
| 89 | 89 | $n_d$(B): 1.48 | A11-25 | 2.1 | | 697 | 91.2 | 680 | 710 | 30 | 596 | 84 | 124.3 |
| 90 | 90 | Polycarbonate | A11-20 | 10.5 | 0.6 | 708 | 95.3 | 692 | 722 | 30 | 612 | 80 | 127.0 |
| 91 | 91 | TS2020 | A11-22 | 13.8 | | 708 | 95.2 | 691 | 721 | 30 | 612 | 79 | 125.4 |
| 92 | 92 | nd(B): 1.59 | A11-25 | 16.0 | | 709 | 95.1 | 693 | 723 | 30 | 612 | 81 | 128.6 |
| 93 | 93 | Cyclic olefin | A11-20 | 3.9 | 1.7 | 699 | 93.5 | 682 | 712 | 30 | 599 | 83 | 125.5 |
| 94 | 94 | ARTON $n_d$(B): 1.51 | A11-22 | 5.2 | | 707 | 95.3 | 691 | 721 | 30 | 614 | 77 | 116.4 |

TABLE 8

| Example | NIR filter No. | Kind of Transparent resin (B): $n_d$(B) | Dye No. | Ratio of dye to 100 parts by mass of resin [parts by mass] | Film thickness [μm] | $\lambda_{max}$ [nm] | 430 nm to 600 nm Average transmittance [%] | $\lambda_a$ [nm] | $\lambda_b$ [nm] | $\lambda_b - \lambda_a$ [nm] | $\lambda_c$ [nm] | $\lambda_a - \lambda_c$ [nm] | $I_s$ value |
|---|---|---|---|---|---|---|---|---|---|---|---|---|---|
| 95 | 95 | Polycarbonate | A11-20 | 7.3 | 0.9 | 706 | 94.5 | 690 | 720 | 30 | 611 | 79 | 126.4 |
| 96 | 96 | SP1516 | A11-22 | 9.6 | | 707 | 95.3 | 691 | 721 | 30 | 612 | 79 | 126.4 |
| 97 | 97 | nd(B): 1.60 | A11-25 | 11.1 | | 707 | 95.6 | 690 | 720 | 30 | 612 | 78 | 124.8 |
| 98 | 98 | Polycarbonate | A11-20 | 2.3 | 2.4 | 710 | 95.6 | 693 | 723 | 30 | 618 | 68 | 122.4 |
| 99 | 99 | EP5000 | A11-24 | 3.1 | | 710 | 95.9 | 694 | 724 | 30 | 620 | 69 | 120.8 |
| 100 | 100 | nd(B): 1.63 | A11-25 | 3.5 | | 710 | 95.5 | 693 | 723 | 30 | 619 | 69 | 120.8 |
| 101 | 101 | Polycarbonate | A11-20 | 2.3 | 2.8 | 710 | 95.0 | 694 | 724 | 30 | 618 | 76 | 124.2 |
| 102 | 102 | SP3810 | A11-24 | 3.0 | | 710 | 95.4 | 694 | 724 | 30 | 621 | 73 | 119.3 |
| 103 | 103 | nd(B): 1.63 | A11-25 | 3.4 | | 710 | 95.3 | 694 | 724 | 30 | 621 | 73 | 119.3 |
| 104 | 104 | | A11-20 | 2.3 | 1.0 | 710 | 93.6 | 693 | 723 | 30 | 614 | 79 | 129.1 |
| 105 | 105 | | A11-24 | 3.0 | | 710 | 95.2 | 693 | 723 | 30 | 618 | 75 | 122.6 |
| 106 | 106 | | A11-25 | 3.4 | | 710 | 94.6 | 693 | 723 | 30 | 618 | 75 | 122.6 |
| 107 | 107 | Acrylic resin | A11-20 | 2.8 | 2.3 | 704 | 93.1 | 687 | 717 | 30 | 596 | 91 | 142.1 |
| 108 | 108 | BR50 | A11-24 | 2.0 | | 705 | 93.7 | 688 | 718 | 30 | 603 | 85 | 132.7 |
| 109 | 109 | $n_d$(B): 1.56 | A11-25 | 1.4 | | 705 | 94.5 | 688 | 718 | 30 | 605 | 83 | 129.6 |

From Table 4 to Table 6, the $I_s$ value of the near-infrared absorbing layer in the NIR filters 1 to 75 as examples of the present invention is 115 or less by operation of the dyes (A11-1) to (A11-19). That is, it can be seen that the absorption curve is steep in the vicinity of the boundary between the visible light region and the near-infrared region with respect to the transmission spectrum of the near-infrared absorbing layer.

The $I_s$ value of the near-infrared absorbing layers in the NIR filters 76 to 109 corresponding to comparative examples presented in Table 7 and Table 8 is high exceeding 115 because the dyes (A11-20) to (A11-27) are used. That is, it can be seen that the absorption curve has a gradual inclination in the vicinity of the boundary between the visible light region and the near-infrared region.

(2) Heat Resistance

A heat resistance test was performed on the above NIR filter 7 and the NIR filter 76 as a comparative example, so as to evaluate heat resistance.

The heat resistance test was a test heating the NIR filter at 180° C. for five hours. Further, transmittance in the near-infrared absorbing layer which the NIR filter has is measured similarly to the above after the heat resistance test. The evaluation of heat resistance was performed by estimating with a following formula the percentage (%) of the absorption constant before and after the heat resistance test with a wavelength of 680 nm as a residual ratio (%) of dye.

Residual ratio (%)=light absorption coefficient (ε) after heat resistance test with 680 nm/initial absorption coefficient (ε) with 680 nm×100

As a result, the dye residual ratio after the heat resistance test of the NIR filter 7 (180° C., five hours) was 93%, while the dye residual ratio after the heat resistance test of the NIR filter 76 (180° C., five hours) was 58%. It was demonstrated that the heat resistance of the NIR filter was improved as an effect of the present invention.

[Production of NIR Filter Having a Selected Wavelength Shielding Layer]

In Example 110 below, an NIR filter having a selected wavelength shielding layer (selected wavelength shielding layer 13b) was produced, which is similar except having an antireflection layer instead of the selected wavelength shielding layer 13a in the NIR filter having a structure illustrated in FIG. 1C.

[Transmittance and 20% Shift]

Transmittance of the NIR filter of Example 110 was measured as transmittance of light incident from a direction orthogonal to a main surface, that is, light with an incident angle of 0 degree and transmittance of light incident from a direction making an angle of 30 degrees relative to a line orthogonal to the main surface, that is, light with an incident angle of 30 degrees by using an ultraviolet visible light spectrophotometer (U-4100 type spectrophotometer made by Hitachi High-Technologies Corporation), so as to obtain a transmission spectrum. A 20% shift (30 degrees) is a difference between a value of a wavelength with transmittance of 20% of light with an incident angle of 0 degree (indicated as "$\lambda_{20\text{-}0}$") and a value of a wavelength with transmittance of 20% of light with an incident angle of 30 degrees (indicated as "$\lambda_{20\text{-}30}$").

Moreover, a transmission spectrum of light with an incident angle of 40 degrees was obtained similarly. Further, the difference between a value of a wavelength with transmittance of 20% of light with an incident angle of 0 degree ($\lambda_{20\text{-}0}$) and a value of a wavelength with transmittance of 20% of light with an incident angle of 40 degrees (indicated as "$\lambda_{20\text{-}40}$") was obtained as a 20% shift (40 degrees).

[Design of Shielding Layer]

The selected wavelength shielding layer was formed by a vapor deposition method in a structure in which a $TiO_2$ film as a high-refractive-index dielectric film and an $SiO_2$ film as a low-refractive-index dielectric film are stacked alternately.

Figure 4:
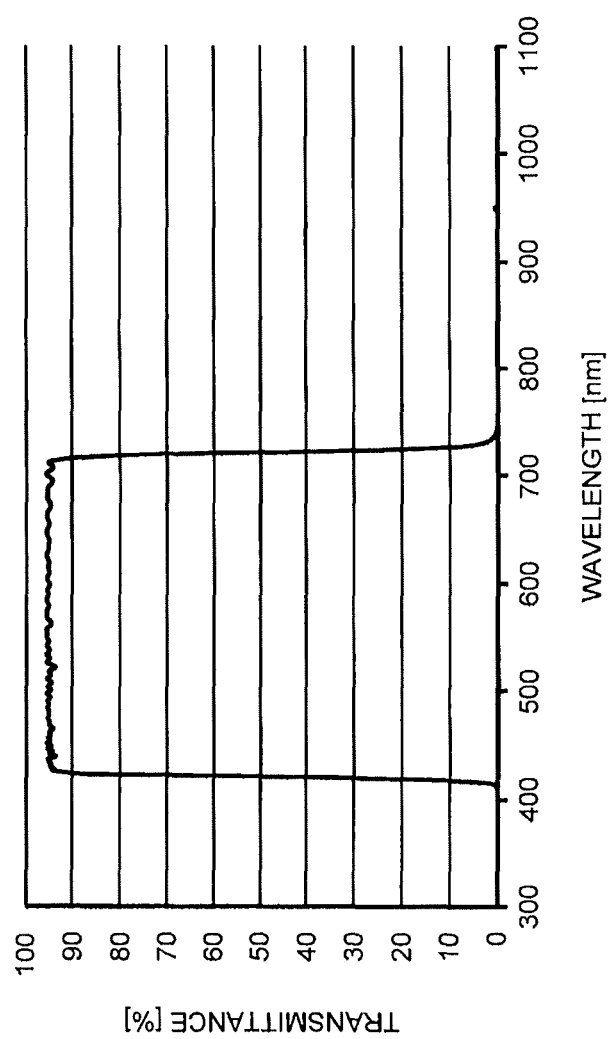
FIG. 4 is a chart illustrating a transmission spectrum of a dielectric multilayer film as a selected wavelength shielding layer, used in combination with a near-infrared absorbing layer according to an embodiment of the present invention.

The structure of the selected wavelength shielding layer was determined by performing a simulation to have desired optical characteristics with the number of stacks of the dielectric multilayer film, the film thickness of the $TiO_2$ film and the film thickness of the $SiO_2$ film being parameters. Optical characteristics of the dielectric multilayer film as the above selected wavelength shielding layer are such that transmittance in the wavelength region of 420 nm to 715 nm is 90% or more, transmittance in the wavelength region of 730 nm to 1100 nm is 2% or less, and transmittance across the entire region of 400 nm or less is 1% or less (FIG. 4).

Figure 5:
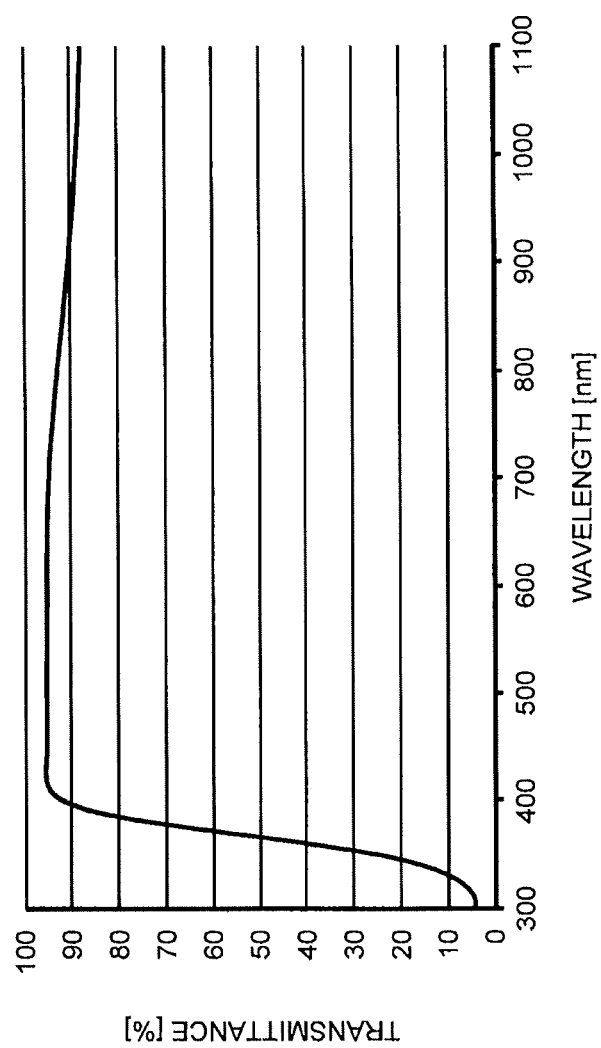
FIG. 5 is a chart illustrating a transmission spectrum of a dielectric multilayer film as an antireflection layer, used in combination with a near-infrared absorbing layer according to an embodiment of the present invention.

The antireflection layer was formed similarly to the selected wavelength shielding layer by a vapor deposition method in a structure in which a $TiO_2$ film as a high-refractive-index dielectric film and an $SiO_2$ film as a low-refractive-index dielectric film are stacked alternately. Also in the design of the antireflection layer, the structure was also determined by performing a simulation to have desired optical characteristics with the number of stacks of the dielectric multilayer film, the film thickness of the $TiO_2$ film and the film thickness of the $SiO_2$ film being parameters (FIG. 5).

Example 110

The near-infrared absorbing layer was formed on a glass plate similarly to Example 7 except that a glass plate on which the selected wavelength shielding layer is formed was used on a face opposite to an application face of the coating liquid for forming the near-infrared absorbing layer. Moreover, the antireflection layer was formed on the near-infrared absorbing layer, so as to obtain the NIR filter 110. The film thickness in the selected wavelength shielding layer in its entirety was approximately 8.9 µm, and the film thickness in the antireflection layer in its entirety was approximately 0.34 µm. The transmittance of the obtained NIR filter 110 was measured, and 20% shifts (30 degrees) and (40 degrees) were obtained. Results thereof are presented in Table 9 together with structures of the near-infrared absorbing layer. FIG. 6 illustrates transmission spectra of light with incident angles of 0 degree, 30 degrees and 40 degrees of the wavelength region of 660 nm to 690 nm in the NIR filter 110 by a solid line, a dotted line and a dashed line, respectively. As can be seen from Table 9, the 20% shift of the 0-degree incident angle and the 30-degree incident angle is 1 nm, and it falls within a 20% shift of 3 nm also with the 40-degree incident angle.

TABLE 9

| Composition of near-infrared absorbing layer, or the like | Near-infrared absorbing dye (A) | Kind; near-infrared absorbing dye (A1) | (A11-7) |
|---|---|---|---|
| | | Parts by mass to 100 parts by mass of transparent resin (B) | 3.0 |
| | Transparent resin(B) | Kind; polyester resin | B-OKP2 |
| | | Refractive index ($n_d(B)$) | 1.64 |
| NIR filter optical characteristics | Transmittance [%] | 420 nm to 620 nm (average) | 88.6 |
| | | 700 nm to 1100 nm (average) | 0.03 |
| | | 710 nm to 1100 nm (maximum) | 0.28 |
| | Wavelength of 20% | 20%-transmittance wavelength of 0-degree incident angle ($\lambda_{20\text{-}0}$) | 668 |

TABLE 9-continued

| | | |
|---|---|---|
| transmittance [nm] | 20%-transmittance wavelength of 30-degree incident angle ($\lambda_{20\text{-}30}$) | 667 |
| | 20%-transmittance wavelength of 40-degree incident angle ($\lambda_{20\text{-}40}$) | 665 |
| 20% shift | 30 degrees ($\lambda_{20\text{-}0}$-$\lambda_{20\text{-}30}$) | 1 nm |
| | 40 degrees ($\lambda_{20\text{-}0}$-$\lambda_{20\text{-}40}$) | 3 nm |

The present filter has a good near-infrared shielding characteristic when used solely or in combination with other selected wavelength shielding members and can also be sufficiently reduced in size and thickness, and hence is useful for an imaging device such as a digital still camera, a display device such as a plasma display, a vehicle (automobile or the like) glass window, a lamp, and the like.

What is claimed is:

1. A near-infrared cut filter comprising:
a near-infrared cut filter comprising a near-infrared absorbing layer, wherein:
the near-infrared absorbing layer comprises a near-infrared absorbing dye and a transparent resin; and
the near-infrared absorbing dye comprises at least one dye according to formula (A 1):

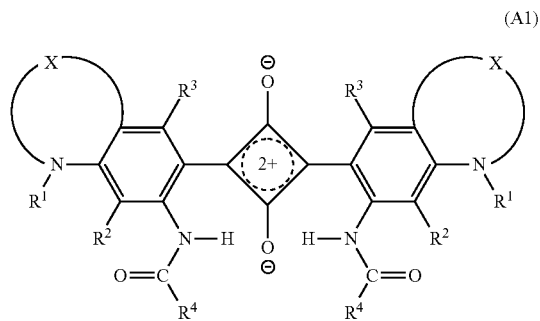

(A1)

where:
each X is independently a bivalent organic group according to formula (1) or formula (2):

—$(CH_2)_{n1}$— (1)

where n1 is 2 or 3:

—$(CH_2)_{n2}$—O—$(CH_2)_{n3}$— (2)

where each n2 and n3 is independently an integer of 0 to 2, and n2+n3 is 1 or 2:
one or more hydrogen atoms in formula (1) and formula (2) may be substituted with an alkyl group or alkoxy group having 1 to 12 atoms;
each $R^1$ is independently a saturated or unsaturated hydrocarbon group having 1 to 12 carbon atoms which may include a saturated ring structure and may have a branch, a saturated cyclic hydrocarbon group having 3 to 12 carbon atoms, an aryl group having 6 to 12 carbon atoms, or an alaryl group having 7 to 13 carbon atoms;
each $R^2$ and $R^3$ is independently a hydrogen atom, a halogen atom, or an alkyl group or alkoxy group having 1 to 10 carbon atoms; and
each $R^4$ is independently a branched hydrocarbon group having 5 to 25 carbon atoms, in which one or more hydrogen atoms may be substituted by a halogen atom, a hydroxyl group, a carboxy group, a sulfo group, or a cyano group, and in which the hydrocarbon group may contain an unsaturated bond, an oxygen atom, or a saturated or unsaturated ring structure between carbon atoms.

2. The near-infrared cut filter according to claim 1, wherein:
each X in formula (A1) is independently a bivalent organic group according to formula (3), —$CR^{11}_2$—$(CR^{12}_2)_{n4}$— (3), where;
the left side of the structure in formula (3) is bonded to the adjacent benzene ring in formula (A1);
the right side of the structure in formula (3) is bonded to the adjacent nitrogen atom in formula (A1);
n4 is 1 or 2;
each $R^{11}$ is independently an alkyl group or alkoxy group having 1 to 12 carbon atoms which may have a branch; and
each $R^{12}$ is independently a hydrogen atom or an alkyl group or alkoxy group having 1 to 12 carbon atoms which may have a branch.

3. The near-infrared cut filter according to claim 2, wherein, in formula (3):
each $R^{11}$ is independently an alkyl group or alkoxy group having 1 to 6 carbon atoms which may have a branch; and
each $R^{12}$ is independently a hydrogen atom or an alkyl group or alkoxy group having 1 to 6 carbon atoms which may have a branch.

4. The near-infrared cut filter according to claim 1, wherein each X in formula (A1) is independently a bivalent organic group according to any of formula (11-1) to formula (12-3):

—$C(CH_3)_2$—$CH(CH_3)$— (11-1),

—$C(CH_3)_2$—$CH_2$— (11-2),

—$C(CH_3)_2$—$CH(C_2H_5)$— (11-3),

—$C(CH_3)_2$—$CH_2$—$CH_2$— (12-1),

—$C(CH_3)_2$—$CH_2$—$CH(CH_3)$— (12-2),

—$C(CH_3)_2$—$CH(CH_3)$—$CH_2$— (12-3), where the left side of the structure in each of formula (11-1) to formula (12-3) is bonded to the adjacent benzene ring in formula (A1), and the right side of the structure in each of formula (11-1) to formula (12-3) is bonded to the adjacent nitrogen atom in formula (A1).

5. The near-infrared cut filter according to claim 1, wherein, in the formula (A1), each $R^4$ is independently a branched hydrocarbon group having 5 to 25 carbon atoms with no substituent according to formula (4):

—$CH_{3-m}R^{13}_m$ (4)

where:
m is 1, 2 or 3;

each $R^{13}$ is independently a linear or branched hydrocarbon group, $R^{13}$ being branched when m is 1, and $R^{13}$ optionally containing an unsaturated bond, an oxygen atom, or a saturated or unsaturated ring structure between carbon atoms; and a total number of carbon atoms of the group or groups $R^{13}$ is 4 to 24.

6. The near-infrared cut filter according to claim 1, wherein a total number of carbon atoms of each group $R^4$ in formula (A1) is independently 6 to 20.

7. The near-infrared cut filter according to claim 1, wherein, when the near-infrared absorbing dye is present in an amount sufficient to satisfy conditions (ii-1) and (ii-2), the near-infrared absorbing layer satisfies condition (ii-3):
   (ii-1) a shortest wavelength $\lambda_a$ with transmittance of 1% in a wavelength region of 650 nm to 800 nm is 675 nm≤$\lambda_a$≤720 nm;
   (ii-2) a relation between a longest wavelength $\lambda_b$ with transmittance of 1% in the wavelength region of 650 nm to 800 nm and $\lambda_a$ is $\lambda_b$−$\lambda_a$=30 nm; and
   (ii-3) a relation of a wavelength $\lambda_c$ with transmittance of 70% on a shorter wavelength side than $\lambda_a$ in the wavelength region of 650 nm to 800 nm, $\lambda_a$, and a refractive index $n_d(B)$ of the transparent resin is $n_d(B) \times (\lambda_a - \lambda_c) \leq 115$.

8. The near-infrared cut filter according to claim 1, wherein the transparent resin comprises at least one resin selected from the group consisting of acrylic resin, epoxy resin, ene-thiol resin, polycarbonate resin, polyether resin, polyarylate resin, polysulfone resin, polyethersulfone resin, polyparaphenylene resin, polyaiylene ether phosphine oxide resin, polyimide resin, polyamide-imide resin, polyolefin resin, cyclic olefin resin, and polyester resin.

9. The near-infrared cut filter according to claim 1, wherein the near-infrared absorbing dye is present in an amount of 0.1 to 20 parts by mass relative to 100 parts by mass of the transparent resin.

10. The near-infrared cut filter according to claim 1, further comprising a selected wavelength shielding layer on one or both sides of the near-infrared absorbing layer, wherein the selected wavelength shielding layer has characteristics (iii-1) and (iii-2):
   (iii-1) a transmittance of 90% or more in a wavelength region of 420 nm to 695 nm; and
   (iii-2) a transmittance of 2% or less in a wavelength region from a wavelength $\lambda_b$ to 1100 nm, the wavelength $\lambda_b$ being a longest wavelength in a wavelength region of 650 nm to 800 nm at which the near-infrared absorbing layer has a transmittance of 1%.

11. The near-infrared cut filter according to claim 10, wherein the selected wavelength shielding layer comprises a dielectric multilayer film comprising an alternating stack of a first dielectric film and a second dielectric film, wherein:
   the first dielectric film has a refractive index of 1.45 or more and less than 1.55; and
   the second dielectric film has a refractive index of 2.2 to 2.5.

12. The near-infrared cut filter according to claim 10, wherein the near-infrared cut filter satisfies conditions (iv-1), (iv-2) and (iv-3):
   (iv-1) an average transmittance of 80% or more in a wavelength region of 420 nm to 620 nm;
   (iv-2) a transmittance of 2% or less in a wavelength region of 710 nm to 1100 nm; and
   (iv-3) a difference of 3 nm or less between a wavelength with 20% transmittance of light incident from a direction orthogonal to a main surface and a wavelength with 20% transmittance of light incident from a direction making an angle of 30 degrees relative to a line orthogonal to the main surface, in a wavelength region of 600 nm to 700 nm.

13. The near-infrared cut filter according to claim 1, the transparent resin has a refractive index of 1.45 or more.

14. The near-infrared cut filter according to claim 1, the transparent resin has a refractive index of 1.5 or more.

* * * * *